(12) United States Patent
Martin

(10) Patent No.: US 8,550,294 B2
(45) Date of Patent: Oct. 8, 2013

(54) CARD DISPENSING APPARATUSES AND ASSOCIATED METHODS OF OPERATION

(75) Inventor: Douglas A. Martin, Woodinville, WA (US)

(73) Assignee: Outerwall Inc., Bellevue, WA (US)

( * ) Notice: Subject to any disclaimer, the term of this patent is extended or adjusted under 35 U.S.C. 154(b) by 218 days.

(21) Appl. No.: 12/806,531

(22) Filed: Aug. 12, 2010

(65) Prior Publication Data
US 2011/0042403 A1    Feb. 24, 2011

Related U.S. Application Data

(60) Provisional application No. 61/233,348, filed on Aug. 12, 2009.

(51) Int. Cl.
| | |
|---|---|
| *G07F 11/00* | (2006.01) |
| *B65G 59/00* | (2006.01) |
| *B65H 3/44* | (2006.01) |
| *B65H 5/00* | (2006.01) |

(52) U.S. Cl.
USPC ........... 221/131; 221/236; 221/133; 221/124; 221/233

(58) Field of Classification Search
USPC .................. 221/124, 133, 233, 131, 263, 236
See application file for complete search history.

(56) References Cited

U.S. PATENT DOCUMENTS

| | | | | |
|---|---|---|---|---|
| 3,160,315 A | * | 12/1964 | Stone et al. | 221/127 |
| 3,655,092 A | * | 4/1972 | Hall et al. | 221/133 |
| 3,757,917 A | | 9/1973 | Waiwood et al. | |
| 3,947,118 A | | 3/1976 | Amort | |
| 4,209,108 A | * | 6/1980 | Winans | 221/6 |
| 4,252,250 A | | 2/1981 | Toth | |
| 4,322,067 A | | 3/1982 | Masselin et al. | |
| 4,526,264 A | * | 7/1985 | MacNamara et al. | 194/217 |
| 4,591,069 A | * | 5/1986 | Stewart | 221/6 |
| 4,687,119 A | | 8/1987 | Juillet | |
| 4,825,054 A | | 4/1989 | Rust et al. | |
| 5,010,997 A | * | 4/1991 | Matsuo et al. | 198/349.7 |

(Continued)

FOREIGN PATENT DOCUMENTS

| | | |
|---|---|---|
| DE | 3147603 | 6/1983 |
| EP | 0313294 | 4/1989 |

(Continued)

OTHER PUBLICATIONS

U.S. Appl. No. 12/795,799, Martin et al.

(Continued)

*Primary Examiner* — Michael K Collins
(74) *Attorney, Agent, or Firm* — Perkins Coie LLP

(57) ABSTRACT

Apparatuses, systems, and methods for dispensing credit cards, phone cards, in-store gift cards, and the like from customer-operated kiosks and other machines. In one embodiment, a card dispensing apparatus can include a plurality of card hopper assemblies arranged in an array of two or more vertical columns, each column including two or more card hopper assemblies. Each card hopper assembly can include a card hopper configured to hold a vertical stack of horizontally oriented cards. Each card hopper assembly can further include a card ejector assembly configured to eject the bottom-most card from each card stack. The card dispenser can further include a movable card carriage that can be selectively positioned to receive a card from any of the card hoppers and read information from the card before dispensing the card to a customer.

14 Claims, 16 Drawing Sheets

(56) References Cited

U.S. PATENT DOCUMENTS

| | | | |
|---|---|---|---|
| 5,106,260 A | 4/1992 | Obrecht | |
| 5,271,628 A | 12/1993 | Okada | |
| 5,350,906 A | 9/1994 | Brody et al. | |
| 5,365,046 A | 11/1994 | Haymann | |
| 5,368,286 A | 11/1994 | Horsman et al. | |
| 5,457,305 A | 10/1995 | Akel et al. | |
| 5,531,640 A | 7/1996 | Inoue | |
| 5,542,571 A * | 8/1996 | Belka | 221/268 |
| 5,555,497 A | 9/1996 | Helbling | |
| 5,564,546 A | 10/1996 | Molbak et al. | |
| 5,577,959 A | 11/1996 | Takemoto et al. | |
| 5,584,589 A | 12/1996 | Adkins et al. | |
| 5,637,845 A | 6/1997 | Kolls | |
| 5,665,952 A | 9/1997 | Ziarno | |
| 5,699,328 A | 12/1997 | Ishizaki et al. | |
| 5,743,429 A * | 4/1998 | Morofsky | 221/7 |
| 5,746,299 A | 5/1998 | Molbak et al. | |
| 5,799,767 A | 9/1998 | Molbak | |
| 5,839,956 A | 11/1998 | Takemoto et al. | |
| 5,857,588 A * | 1/1999 | Kasper | 221/274 |
| 5,949,046 A | 9/1999 | Kenneth et al. | |
| 5,974,146 A | 10/1999 | Randle et al. | |
| 6,102,248 A | 8/2000 | Yamamiya | |
| 6,105,009 A | 8/2000 | Cuervo | |
| 6,116,402 A | 9/2000 | Beach et al. | |
| 6,129,275 A | 10/2000 | Urquhart et al. | |
| 6,138,106 A | 10/2000 | Walker et al. | |
| 6,144,946 A | 11/2000 | Iwamura et al. | |
| 6,149,064 A | 11/2000 | Yamaoka et al. | |
| 6,185,545 B1 | 2/2001 | Resnick et al. | |
| 6,230,928 B1 | 5/2001 | Hanna et al. | |
| 6,233,564 B1 | 5/2001 | Schulze, Jr. | |
| 6,253,955 B1 | 7/2001 | Bower | |
| 6,289,324 B1 | 9/2001 | Kawan | |
| 6,318,536 B1 | 11/2001 | Korman et al. | |
| 6,405,182 B1 | 6/2002 | Cuervo | |
| 6,415,262 B1 | 7/2002 | Walker et al. | |
| 6,494,365 B1 | 12/2002 | Kozakai et al. | |
| 6,494,776 B1 | 12/2002 | Molbak | |
| 6,527,139 B2 | 3/2003 | Seagle | |
| 6,597,970 B1 | 7/2003 | Steury et al. | |
| 6,786,355 B2 | 9/2004 | Chirnomas | |
| 6,805,286 B2 | 10/2004 | Hilton et al. | |
| 6,957,746 B2 | 10/2005 | Martin et al. | |
| 7,044,330 B2 | 5/2006 | Chirnomas | |
| 7,044,332 B2 | 5/2006 | Giegerich et al. | |
| 7,128,261 B1 | 10/2006 | Henderson et al. | |
| 7,156,300 B1 | 1/2007 | Dentlinger | |
| 7,255,268 B2 | 8/2007 | Dentlinger | |
| 7,377,507 B2 * | 5/2008 | Yamamiya | 271/11 |
| 7,383,099 B2 * | 6/2008 | Pollard et al. | 700/232 |
| 7,653,599 B2 | 1/2010 | Doran et al. | |
| 7,677,565 B2 * | 3/2010 | Grauzer et al. | 273/149 R |
| 7,726,645 B2 | 6/2010 | Gerlier et al. | |
| 7,748,619 B2 * | 7/2010 | Martin et al. | 235/381 |
| 7,764,836 B2 | 7/2010 | Downs, III et al. | |
| 7,815,071 B2 * | 10/2010 | Martin et al. | 221/92 |
| 8,033,375 B2 * | 10/2011 | Doran et al. | 194/217 |
| 8,038,059 B2 * | 10/2011 | Martin et al. | 235/381 |
| 8,131,398 B2 * | 3/2012 | Fan et al. | 700/243 |
| 2002/0026423 A1 | 2/2002 | Maritzen et al. | |
| 2006/0037835 A1 | 2/2006 | Doran et al. | |
| 2006/0069642 A1 | 3/2006 | Doran et al. | |
| 2006/0207856 A1 | 9/2006 | Dean et al. | |
| 2007/0088459 A1 * | 4/2007 | Pollard et al. | 700/234 |
| 2007/0125620 A1 | 6/2007 | Sorenson et al. | |
| 2007/0125845 A1 * | 6/2007 | Martin et al. | 235/381 |
| 2008/0164279 A1 | 7/2008 | Chirnomas et al. | |
| 2009/0018959 A1 | 1/2009 | Doran et al. | |
| 2009/0045255 A1 | 2/2009 | Adams | |

FOREIGN PATENT DOCUMENTS

| | | |
|---|---|---|
| EP | 0857579 A2 | 8/1998 |
| EP | 1178448 | 2/2002 |
| GB | 2188467 | 9/1987 |
| JP | 1246698 A | 10/1989 |
| JP | 3-63795 | 3/1991 |
| JP | 2000094871 | 4/2000 |
| WO | WO-9950785 | 10/1999 |

OTHER PUBLICATIONS

U.S. Appl. No. 12/877,261, Martin et al.
U.S. Appl. No. 12/940,541, Martin et al.
International Search Report and Written Opinion for International Application No. PCT/US10/02249, Mail Date Nov. 8, 2010, 14 pages.
Sheehan, Michael, "Marriage of Convenience," http://www.kioskbusiness.com/NovDec01/articles/article4.html [accessed May 16, 2003], 3 pages.
Tranax Technologies, Inc., "Card Dispenser," 2007, <http://www.tranax.com/products/self-service_products/accessories/index.cfm?product=carddisp>, [Internet accessed on Aug. 11, 2009], 1 page.
Extended European Search Report, International Application No. PCT10808465.8, Feb. 22, 2013, 5 pages.

* cited by examiner

CARD DISPENSING APPARATUSES AND ASSOCIATED METHODS OF OPERATION

CROSS-REFERENCE TO APPLICATION(S) INCORPORATED BY REFERENCE

The present application claims priority to U.S. Provisional Patent Application No. 61/233,348, filed Aug. 12, 2009, and entitled "CARD DISPENSING APPARATUSES AND ASSOCIATED METHODS OF OPERATION," which is incorporated herein in its entirety by reference. The disclosures of U.S. Pat. Nos. 6,494,776 and 6,957,746; and U.S. Patent Application Nos. 60/357,331, 60/357,519, 60/357,555, 60/475,804, Ser. Nos. 10/367,110, 10/504,436, 10/504,437, 10/504,438, 10/558,907, 10/995,032, 11/294,637, 11/294,652, and 12/177,275; are also incorporated herein in their entireties by reference.

TECHNICAL FIELD

The following disclosure relates generally to systems, apparatuses and methods for dispensing cards, such as wallet-sized cards and the like from kiosks and other structures.

BACKGROUND

Various types of vending machines and kiosks dispense prepaid credit cards, debit cards, phone cards, gift cards, and the like to customers. Such machines typically include a user interface for selecting a card, a monetary input device for receiving payment (e.g., a credit card reader or bill acceptor), and an outlet for dispensing the card to the customer. To purchase a card, the customer selects a desired card and deposits the required funds. Once the machine has confirmed payment, a card dispenser housed within the machine dispenses the desired card to the consumer via the outlet.

FIG. 1 is an isometric view of a card dispenser 100 configured in accordance with the prior art. The card dispenser 100 includes a card hopper 102 containing a plurality of cards 101, a card conveyor 104, a card reader 106, and a card outlet 108. In a typical card vending machine, the card dispenser 100 is housed within the machine so that only the card outlet 108 is exposed. In operation, after a user has selected a desired card and deposited the required funds, the card conveyor 104 removes the bottom-most card 101 from the hopper 102 and moves the card forward past the card reader 106.

As the card moves past the card reader 106, the card reader 106 reads information off a magnetic stripe on the card. The magnetic stripe can include one or more "tracks" of information. The information can include a unique code for associating the card with a particular account. For example, if the card is a prepaid credit card, then the code can be associated with a specific credit card account. Similarly, if the card is a prepaid phone card, then the code can be associated with a specific long-distance account. After moving past the card reader 106, the card conveyor 104 pushes the card through the outlet 108 to the user.

One shortcoming of the prior art card dispenser 100 is that it can only dispense a single type of card. As a result, additional card dispensers are required if more than one type of card is to be dispensed from a particular vending machine. Adding additional card dispensers, however, increases the cost, size, and weight of the vending machine. In addition, multiple card dispensers can increase the risk of card theft through the card outlets.

DETAILED DESCRIPTION

Figure 1:
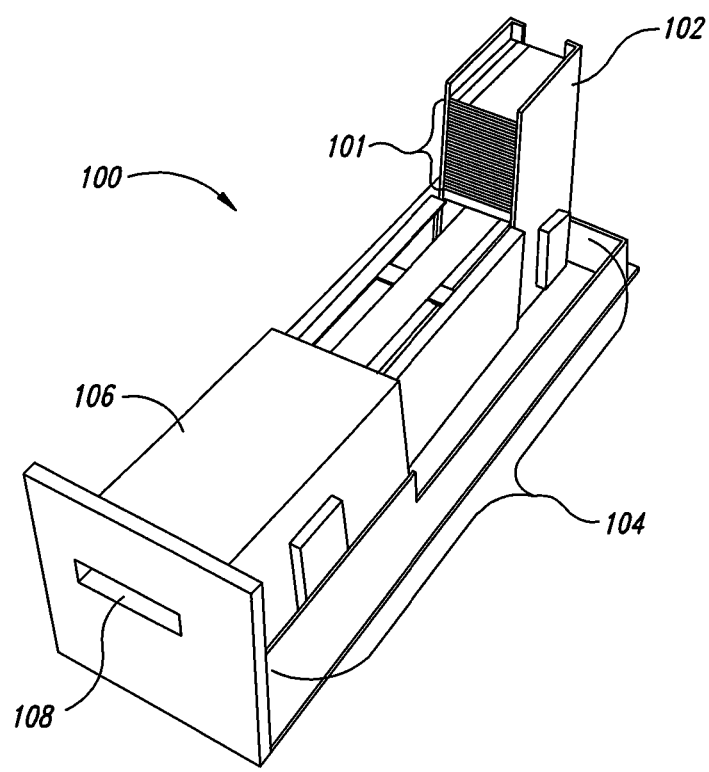
FIG. 1 is an isometric view of a card dispenser configured in accordance with the prior art.

The following disclosure describes apparatuses, systems and methods for dispensing various types of cards (e.g., wallet-sized credit cards, debit cards, phone cards, gift cards, and the like) and/or other items from vending machines, kiosks and/or other structures. The cards can have physical properties defined by one or more of the International Organization for Standardization (ISO) standards, which are commonly used for banking cards (ATM cards, credit cards, debit cards, etc.). The ISO standards can include ISO/IEC 7810 ID-1, ISO/IEC 7811, ISO/IEC 7812, ISO/IEC 7813, ISO 8583, and ISO 4909. These standards can define, for example, card size (e.g., 3.370 in.×2.125 in.), card flexibility, and magstripe location, magnetic characteristics and data formats. The ISO standards can also provide standards for financial cards, including the allocation of card number ranges to different card issuing institutions. In addition or alternatively, the cards can also include features defined by the ABA (American Banking Association) CR-80 standard. The apparatuses, systems and methods disclosed herein can also include various features for reading information from, and for writing information to, various types of storage media on cards. Such media can include, for example, magnetic media (e.g., magnetic stripes or "magstripes") complying with one or more ISO standards, optical media, barcodes, memory chips, embedded integrated circuits, radio frequency tags, transponder devices, etc.

Certain embodiments of the apparatuses and methods described herein are described in the context of computer-executable instructions performed by a general-purpose computer or other processing equipment. In one embodiment, these computer-executable instructions can be stored on a computer-readable medium, such as a floppy disk, hard disk, CD-ROM, etc. In other embodiments, these instructions can be stored on a server computer system and accessed via a communications link or a computer network, such as an intranet, the Internet, or other computer network. Because the basic structures and functions related to computer-readable routines and corresponding implementations are known, they have not been shown or described in detail here to avoid unnecessarily obscuring the described embodiments.

Certain details are set forth in the following description and in FIGS. 2A-9 to provide a thorough understanding of various embodiments of the disclosure. Those of ordinary skill in the relevant art will appreciate, however, that the invention can have additional embodiments that may be practiced without several of the details described below. In addition, some well-known structures and systems often associated with card dispensing apparatuses and methods have not been shown or described in detail below to avoid unnecessarily obscuring the description of the various embodiments of the disclosure.

The dimensions, angles, and other specifications shown in the figures are merely illustrative of particular embodiments of the disclosure. Accordingly, other embodiments can have other dimensions, angles, and specifications without departing from the spirit or scope of the present disclosure.

In the drawings, identical reference numbers identify identical, or at least generally similar elements. To facilitate the discussion of any particular element, the most significant digit or digits in any reference number refers to the figure in which that element is first introduced. For example, element 210 is first introduced and discussed with reference to FIG. 2.

Figure 2A:
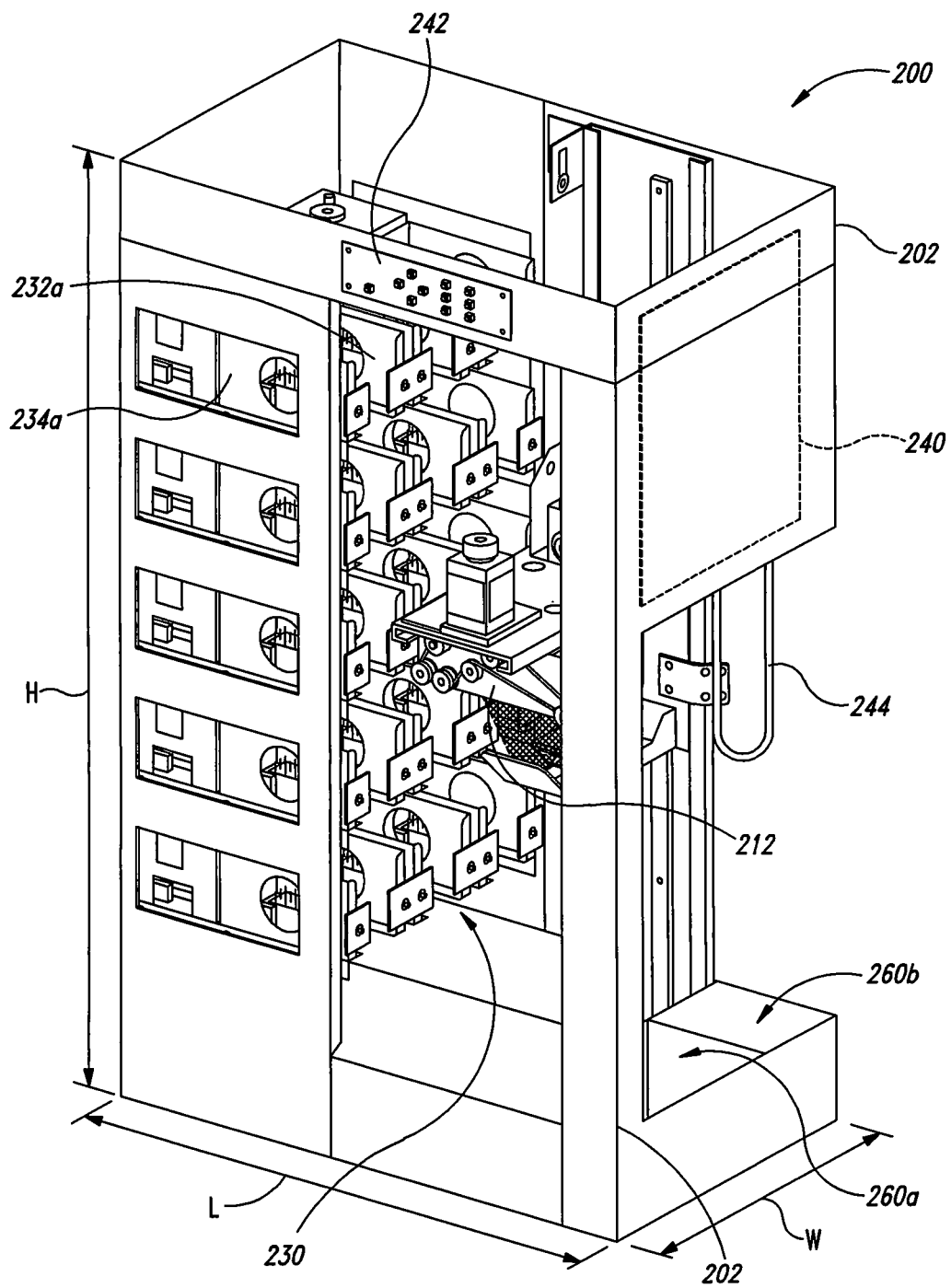
FIG. 2A is an isometric view of a multi-hopper card dispensing apparatus configured in accordance with an embodiment of the disclosure.
Figure 2B:
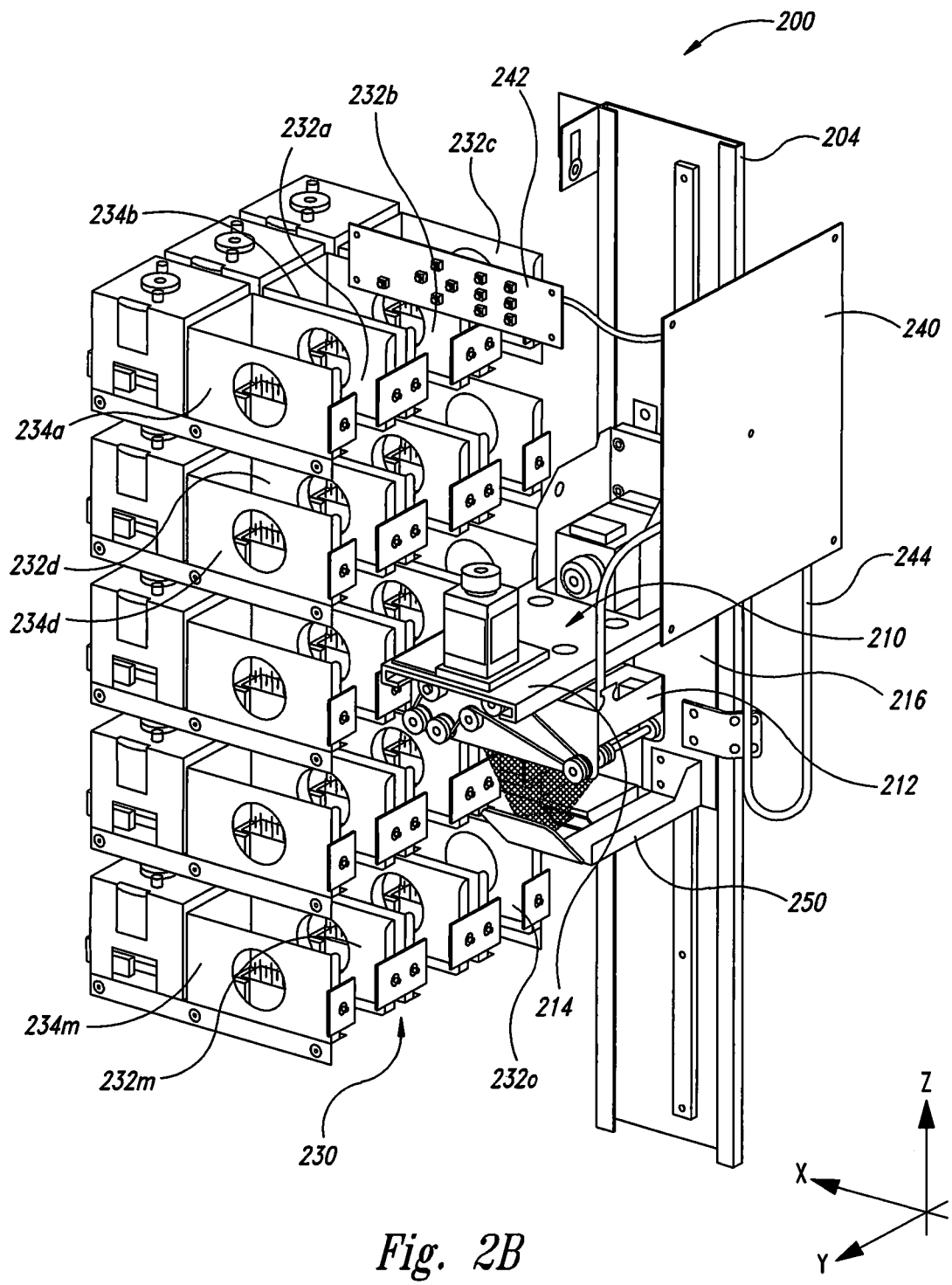
FIG. 2B is an isometric view of the card dispensing apparatus with a portion of a chassis removed for clarity.

FIG. 2A is a top isometric view of a card dispenser 200 configured in accordance with an embodiment of the disclosure, and FIG. 2B is a top isometric view of the card dispenser 200 with a portion of a chassis 202 removed for clarity. The card dispenser 200 can be used in a wide variety of kiosks, vending machines, and other machines for dispensing cards, such as wallet-sized credit cards, phone cards, in-store gift cards, etc. For example, various embodiments of the card dispenser 200 disclosed herein can be used with the kiosks and other card systems described in U.S. patent application Ser. Nos. 10/504,438, 10/504,436, 10/504,437, 11/294,637, 10/558,907, and 12/177,275. Each of the aforementioned patent applications is incorporated herein in its entirely by reference.

Referring to FIGS. 2A and 2B together, in one aspect of this embodiment the card dispenser 200 includes a card hopper array 230 that includes a plurality of individual card hopper assemblies 234 (identified individually as card hopper assemblies 234a-234o). Each card hopper assembly 234 includes a corresponding card hopper 232 (identified individually as card hoppers 232a-232o). In the illustrated embodiment, each of the card hoppers 232 is configured to hold at least about 50 wallet-sized cards (not shown), such as 0.030 inch thick flat or embossed style cards. Each card can include a magnetic stripe (e.g., a conventional magnetic stripe with three tracks of data), one or more barcodes (in, e.g., various different formats), etc. In other embodiments, the cards can have other sizes and other information storage features.

In the illustrated embodiment, the card hoppers 232 are arranged in a 3×5 array made up of three vertical columns of five hoppers each. In this configuration, the card dispenser 200 has a relatively compact overall size with a width W, a length L, and a height H. In the illustrated embodiment, the width W can be from about 7 inches to about 10 inches, or about 8.25 inches; the length L can be from about 10 inches to about 15 inches, or about 13.5 inches; and the height H can be from about 17 inches to about 24 inches, or about 21.75 inches. Because of the versatile design of the card dispenser 200, however, in other embodiments the card dispenser 200 can include more or fewer card hoppers in different arrays. For example, in other embodiments the card dispenser 200 can include a 5×5 array of card hoppers, a 6×3 array of card hoppers, etc. Accordingly, in other embodiments the card dispenser 200 can have other card hopper arrays and other overall dimensions. In these other embodiments, however, the card dispenser 200 can utilize the same card hopper assemblies 234, card carriage 212, controllers, positioning mechanisms, etc.

In another aspect of this embodiment, the card dispenser 200 includes a carriage positioning assembly 210 that can move a card carriage 212 in both the Y and Z directions as needed to position the card carriage 212 in front of a selected card hopper 232. The carriage positioning assembly 210 includes a Y-axis support 214 that extends outwardly from a Z-axis shuttle 216. The Z-axis shuttle 216 is movably coupled to a Z-axis support 204. As described in greater detail below, the card carriage 212 is movably coupled to the Y-axis support 214, and can move back and forth along the Y-axis relative to the Y-axis support 214. The Z-axis shuttle 216 can move up and down along the Z-axis relative to the Z-axis support 204. A card dispenser controller 240 (e.g., a first circuit card assembly) is operably coupled to the carriage positioning assembly 210 via a flexible cable 244 (e.g., a ribbon cable). The dispenser controller 240 is also coupled to a remote controller 242 (e.g., a second circuit card assembly) and a carriage controller (not shown in FIG. 2A or 2B).

In one embodiment of operation, a customer selects a desired card using a keypad, touchpad, and/or other type of user interface on the kiosk or other type of particular machine in which the card dispenser 200 is positioned (not shown). After confirming payment for the card, the dispenser controller 240 responds to the card selection by moving the card positioning assembly 210 up or down as needed along the Z-axis support 204 to position the card carriage 212 adjacent to the appropriate row of card hoppers 232. In addition, the controller 240 moves the card carriage 212 left or right as needed along the Y-axis to position the card carriage 212 in front of the card hopper 232 holding the desired type of card. As described in greater detail below, the card is then ejected by the corresponding card hopper assembly 234 into the card carriage 212. The card carriage 212 then draws the card inward and past an optional card reader (e.g., a magnetic stripe reader) to read information from data storage media (e.g., a magnetic stripe) on the card. In other embodiments, the card carriage 212 can include a card writer (e.g., a write head) that can write information onto storage media, such as a magnetic media, optical media, and/or an IC. Once properly read (or written to), the card information can be used to activate the card (via, e.g., a remote database), track the sale of the card, retrieve a PIN associated with a card account, generate a receipt, and/or perform other useful functions known in the art. As described in greater detail below, the carriage positioning assembly 210 can also include an optional scanner assembly 250 (having, e.g., a barcode scanner) for scanning and decoding machine-readable indicia on the card (e.g., a barcode containing a card number for inventory tracking purposes, a card price, a card type, etc.) after the card is withdrawn from the respective hopper 232.

Once the card information has been properly read (if necessary), the carriage positioning assembly 210 positions the card carriage 212 above a card accept chute 260a, and the card carriage 212 dispenses the card into the accept chute 260a. From the card accept chute 260a, the card travels to an outlet (not shown) for retrieval by the customer. Conversely, if the card has not been properly read after one or more tries, the card carriage 212 drops the card into a card reject chute 260b. The card carriage 212 then returns to the appropriate card hopper 232 and retrieves another card for dispensing to the customer.

Figure 3:
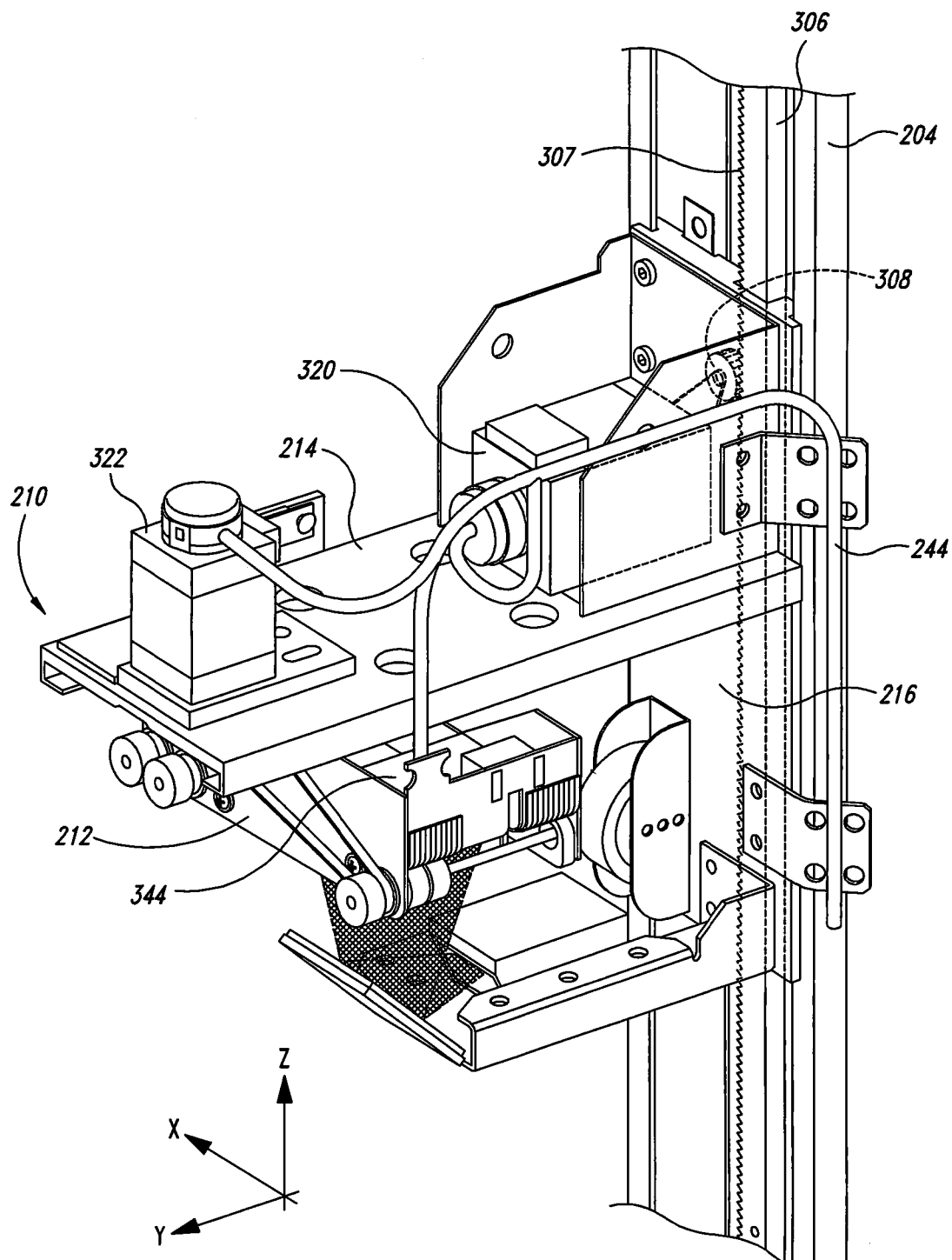
FIG. 3 is an enlarged, top isometric view of a card carriage positioning assembly configured in accordance with an embodiment of the disclosure.

FIG. 3 is an enlarged isometric view of the carriage positioning assembly 210 configured in accordance with an embodiment of the disclosure. A rack 306 having a row of teeth 307 is fixedly attached to the Z-axis support 204. A Z-axis motor 320 (e.g., an electric motor, such as a bipolar stepper motor) is attached to a proximal end portion of the Y-axis support 214, and drives a spur gear 308 that engages the teeth 307 on the rack 306. The motor 320 responds to electrical signals from the dispenser controller 240 (FIG. 2A) via the cable 244 by moving the carriage assembly 210 up or down as required along the Z-axis.

A Y-axis motor 322 (e.g., an electric motor, such as a bipolar stepper motor) is attached to a distal end portion of the Y-axis support 214. The Y-axis motor 322 responds to signals from the dispenser controller 240 by moving the card carriage 212 back and forth as required along the Y-axis. As this view illustrates, the dispenser controller 240 (FIGS. 2A and 2B) is also connected to a card carriage controller 344 (e.g., a third circuit card assembly) via the cable 244. As described in greater detail below, the card carriage 212 responds to signals from the dispenser controller 240 via the card carriage controller 344. The signals cause the card carriage 212 to receive selected cards from the card hoppers 232 and dispense the cards into the appropriate chute 260 (FIG. 2A).

Figure 4:
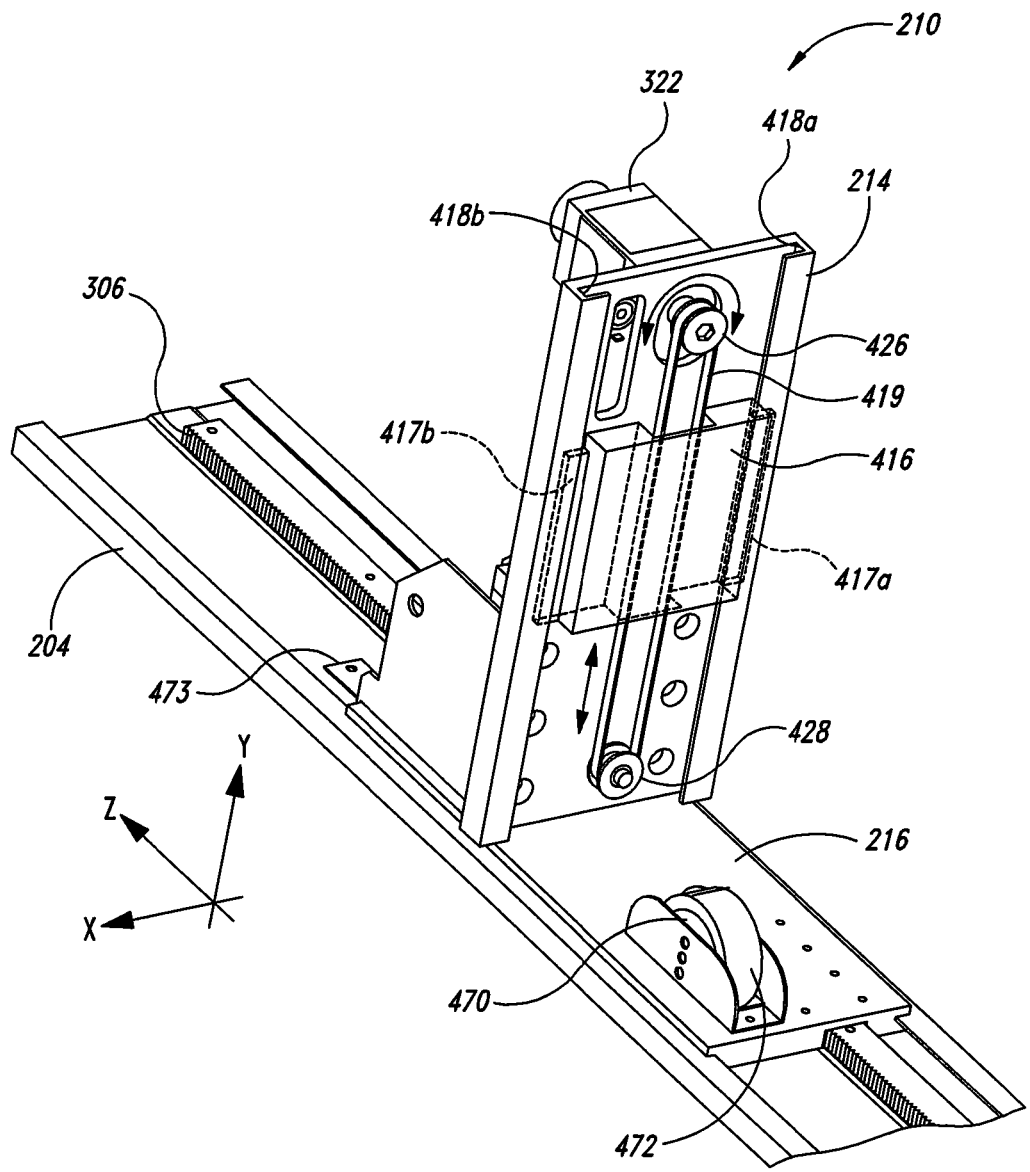
FIG. 4 is a bottom isometric view of the card carriage positioning assembly of FIG. 3 with selected structures removed for clarity.

FIG. 4 is a bottom isometric view of the carriage positioning assembly 210 with the card carriage 212 and the scanner assembly 250 removed for clarity. The card carriage 212 (FIG. 3) is fixedly attached to a Y-axis shuttle 416. The Y-axis shuttle 416 is movably coupled to the Y-axis support 214 by side edges 417a and 417b that are slidably received in corresponding slots 418a and 418b in the Y-axis support 214. The Y-axis shuttle 416 is also attached to a direct drive belt 419 that is operably coupled to a drive pulley 426 and a driven pulley 428. The Y-axis motor 322 can rotate the drive pulley 426 in either direction as necessary to move the Y-axis shuttle 416 back and forth as desired along the Y-axis. A Y-axis sensor (e.g., a reflective infrared (IR) sensor) detects the position of the Y-axis shuttle 416 when the Y-axis shuttle 416 is in a "home" position toward the distal end of the Y-axis support 214. After ascertaining the home position, an incremental encoder (not shown) affixed to the Y-axis motor 322 can position the Y-axis shuttle 416 at any desired location along the Y-axis support 214 relative to the home position.

One or more biasing members 472 (e.g., constant force springs) can be wound around a spool 470 that is rotatably attached to the Z-axis shuttle 216. A distal end portion 473 of the one or more biasing members 472 can be fixedly attached to the Z-axis support 204 at a location above the uppermost position of the carriage positioning assembly 210. By virtue of the constant or near constant force in the biasing members 470, they can offset and/or neutrally balance the weight of the carriage positioning assembly 210 as it moves up and down along the Z-axis support 204 during operation of the card dispenser 200. This reduces the workload on the Z-axis motor 320 (FIG. 3). In other embodiments, however, other biasing member configurations and other means can be used to neutrally balance or offset the weight of the carriage positioning assembly 210, or the offsetting means can be omitted.

Figure 5A:
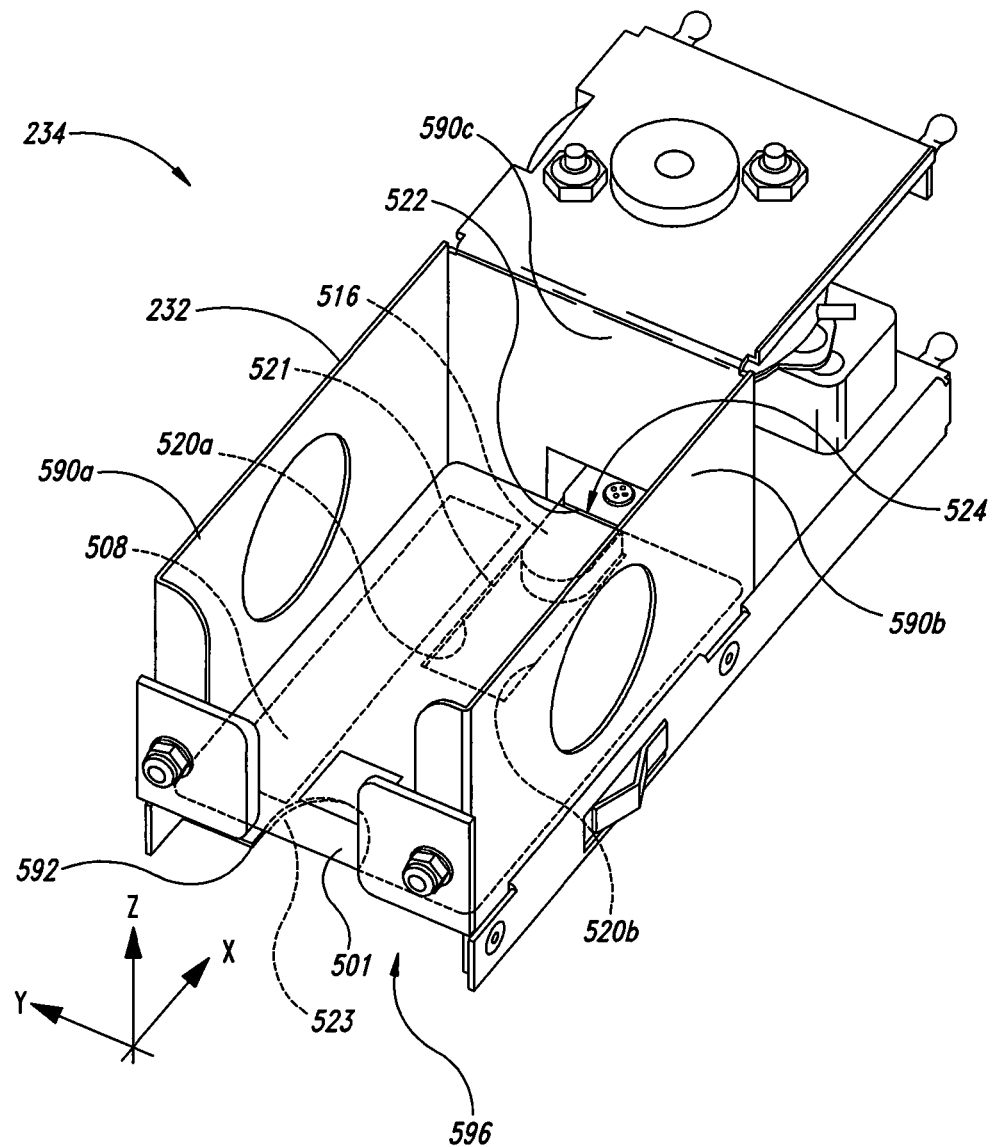
FIG. 5A is an enlarged, top front isometric view of a card hopper assembly configured in accordance with an embodiment of the disclosure.
Figure 5B:
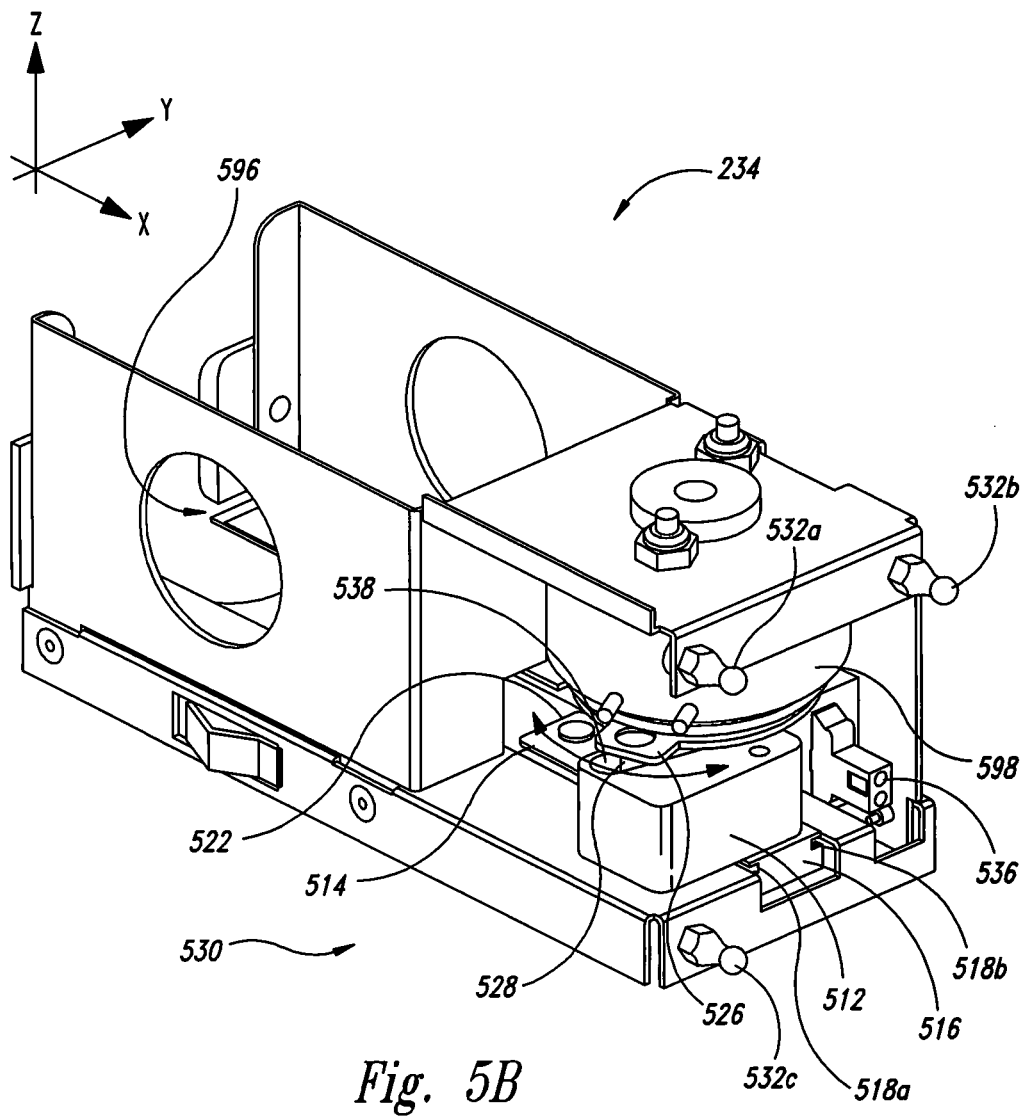
FIG. 5B is a top rear isometric view of the card hopper assembly.

FIG. 5A is a top front isometric view of one of the card hopper assemblies 234 configured in accordance with an embodiment of the disclosure, and FIG. 5B is a top rear isometric view of the card hopper assembly 234. Referring first to FIG. 5A, each card hopper assembly 234 includes a corresponding card hopper 232. The card hopper 232 includes opposing side walls 590 (identified individually as a first sidewall 590a and a second sidewall 590b) and a rear wall 590c extending therebetween. The card hopper 232 also includes a bottom wall 592 that includes a slot 521 and a cutout 523. Although only a single card 501 is shown lying horizontally in the card hopper 232 for purposes of illustration, those of ordinary skill in the art will appreciate that the card hopper 232 is configured to hold a stack of cards, e.g., a vertical stack of at least 30 cards.

Referring next to FIG. 5B, the card hopper assembly 234 further includes a card ejector assembly 530. The card ejector assembly 530 includes a rotator 598 (e.g., a rotary solenoid) that is electrically connected to the dispenser controller 240 (FIGS. 2A and 2B) via a quick disconnect cable connector 536. The rotator 598 includes a slider pin 528 that extends downwardly from a rotating arm 526. The slider pin 528 extends into a transverse slot 538 formed in a cam block 512 which is fixedly attached to a slider 516. The slider 516 includes opposing grooves or slots 518 (identified individually as a first slot 518a and a second slot 518b) formed in opposing sidewalls thereof. The slots 518 are configured to slidably receive opposing side edges 520 (identified individually as a first edge 520a and a second edge 520b) of the slot 521 formed in the bottom wall 592 of the card hopper 232 (FIG. 5A). A card ejector plate 514 is fixedly attached to an upper surface of the slider 516, and has a forward abutment feature or lip 522 configured to contact a rear edge portion 524 of the lower-most card 501 in the card stack. In operation, the dispenser controller 240 (FIG. 2B) transmits a signal to the rotator 598 via the connector 536. In response to the signal, the rotator 598 rotates the slider pin 528 forward toward the –X direction. This drives the cam block 512 forward, which in turn causes the lip 522 of the ejector plate 514 to drive the card 501 out of the card hopper 232 via a card exit 596.

Embossed cards can sometimes stack unevenly. In addition, the embossed numbers and/or letters on such cards can sometimes nest together (especially if the cards are sequentially numbered), and this can cause the cards to interlock or stick together at the mating surfaces. One advantage of embodiments of employing a rotary solenoid for the rotator 598 is that the relatively high power and quick motion of the rotary solenoid can overcome the interlock between the bottom card and the adjacent card above. This can facilitate quick card ejection and reduce binding of the ejection mechanism.

In the illustrated embodiment, each hopper assembly 234 is designed to be detachably "clicked" into a rear portion of the chassis 202 (FIG. 2A) from the front side. To accomplish this, the aft end portion of the hopper assembly 234 can include a plurality of releasable attachment features 532 (identified individually as a first attachment feature 532a, a second attachment feature 532b, and a third attachment feature 532c). In the illustrated embodiment, the attachment features 532 can include ball studs that fit into corresponding Tinnerman fasteners on the dispenser chassis 202 (not shown). This "Plug and Play" concept makes the card hopper array 230

(FIGS. 2A and 2B) easy to assemble and easy to service from one side without tools. In other embodiments, other suitable fasteners and features known in the art can be used to attach the hopper assemblies to the chassis 202 including, for example, captive screws, captive nuts, and/or metal tabs.

Figure 6A:
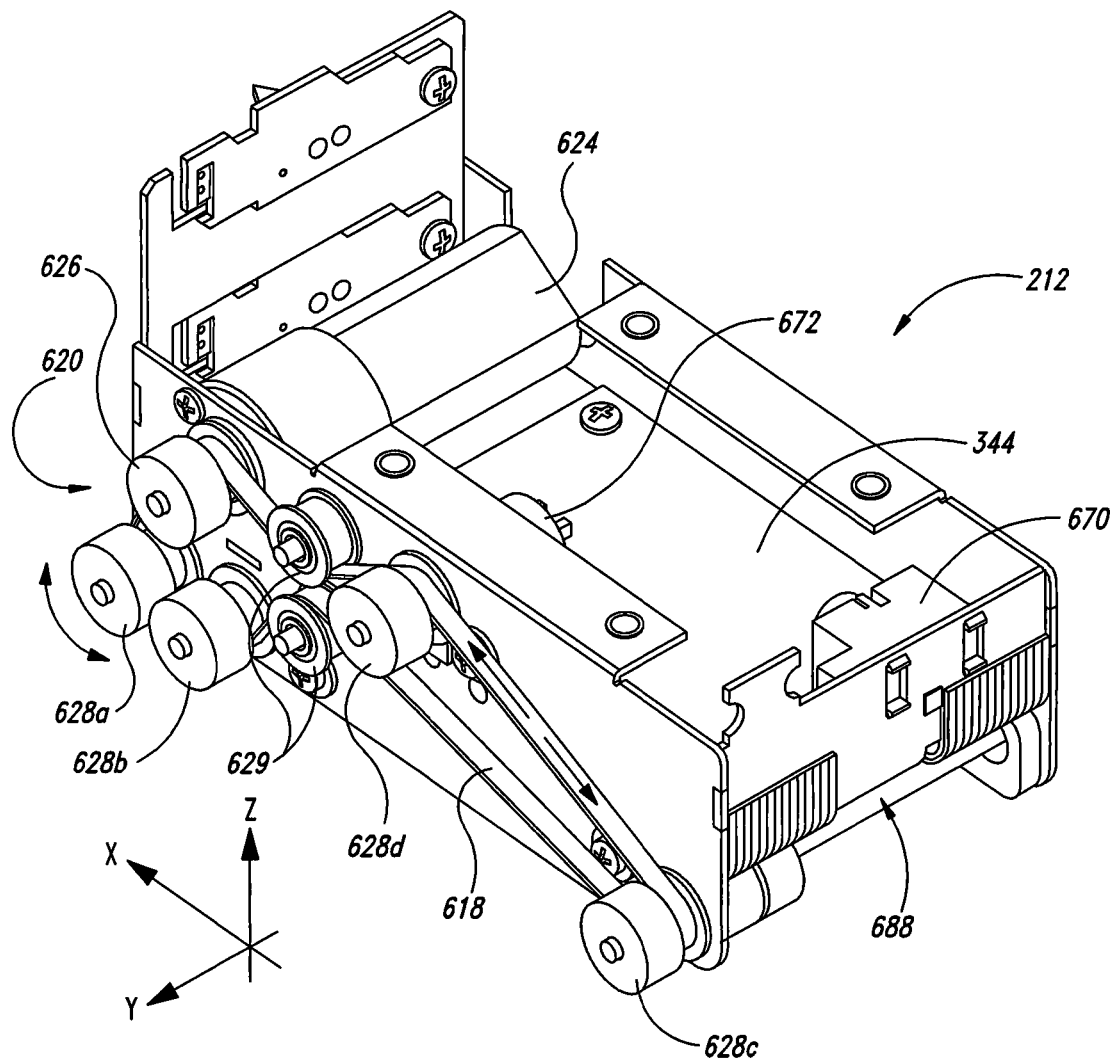
FIG. 6A is an enlarged top isometric view of a card carriage configured in accordance with an embodiment of the disclosure.
Figure 6B:
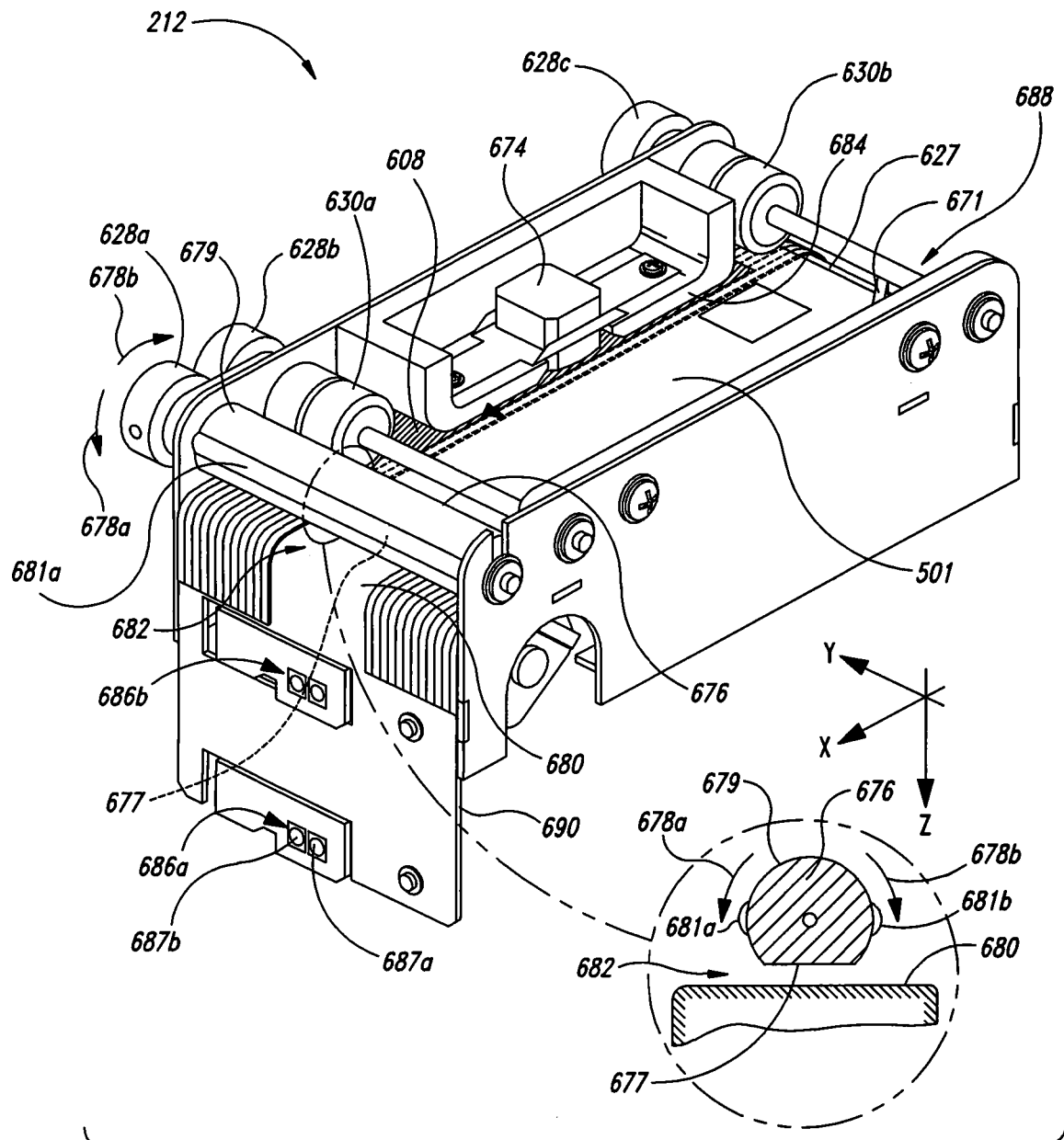
FIG. 6B is a bottom isometric view of the card carriage.

FIG. 6A is an enlarged top isometric view of the card carriage 212, and FIG. 6B is a bottom isometric view of the card carriage 212. Referring first to FIG. 6A, in one aspect of this embodiment the card carriage 212 includes a card transport assembly 620 that moves cards through the card carriage 212. The card transport assembly 620 can include an X-axis motor 624 (e.g., a reversible 24VDC gear motor) that powers a drive pulley 626. The drive pulley 626 is operably engaged with a serpentine drive belt 618 that is operably wrapped around an associated system of driven pulleys 628 (identified individually as a first driven pulley 628a, a second driven pulley 628b, a third driven pulley 628c, and a fourth driven pulley 628d) and two idler pulleys 629.

Referring to FIGS. 6A and 6B together, the first driven pulley 628a is operably coupled to a card intake roller 676 (shown in partial section view in FIG. 6B) that extends transversely across the card carriage 212. In one aspect of this embodiment, the intake roller 676 can include a compressible (e.g., rubber) exterior surface with a "D"-shaped cross section. In other embodiments, the intake roller 676 and/or variations thereof can have other cross-sectional shapes, such as obround shapes, oval shapes, etc. Moreover, the intake roller 676 can include one or more rubber cords 681a, b that extend along all or a portion of the length of the roller to contact and withdraw the cards from the card hopper assembly 234. In the illustrated embodiment, for example, the cords 681 are arranged at about 180 degrees from each other and about 90 degrees from a flat side portion 677 of the D-shaped intake roller 676. In other embodiments, the cords 681 can have other shapes, sizes, and number, or they can be omitted.

The second driven pulley 628b drives a first shaft, to which one or more first drive rollers 630a are operably coupled, and the third driven pulley 628c drives a second shaft, to which one or more second drive rollers 630b are operably coupled. In another aspect of this embodiment, the drive rollers 630 can include compressible (e.g., rubber) exterior surfaces. A card guide 684 is positioned between the two sets of drive rollers 630 and carries a reader 674 (e.g., a magnetic read head). In other embodiments, the card carriage 212 can include a card writer (e.g. a write head) for writing information (e.g., an account number, PIN, etc.) to a card. The card guide 684 and the reader 674 can be space apart from an underside surface 680 of the card carriage 212 to form a slight gap therebetween that the card 501 can pass through.

A forward bulkhead 690 is fixedly attached to a front portion of the card carriage 212 and carries a first sensor 686a (e.g., a first IR reflective sensor) and a second sensor 686b (e.g., a second IR reflective sensor). The sensors 686 can each include an infrared source 687a and an infrared receiver 687b. The infrared source 687a emits a beam of infrared light that reflects off of objects in front of the card carriage 212 (e.g., a stack of cards) and is detected by the infrared receiver 687b. In operation, the sensors 686 detect the position of the card carriage 212 relative to a selected card hopper 232, and transmit this information to the dispenser controller 240. The sensors 686 are vertically offset in the illustrated embodiment to facilitate determining the top and bottom of card stacks. The dispenser controller 240 uses the information from the sensors 686 to accurately position the card carriage 212 in the proper location to receive the bottom-most card from the respective card hopper 232 via a card inlet 682.

As described in greater detail below, a flat side portion 677 of the D-shaped intake roller 676 initially faces toward the underside surface 680 of the card carriage 212, so that a leading edge 627 of the card 501 can enter the card carriage 212 through the card inlet 682 unimpeded. Once the card 501 is beneath the intake roller 676, the X-axis motor 624 drives the intake roller 676 in a first direction 678a, so that a round side portion 679 of the D-shaped roller 676 contacts the card 501 and pulls it from the respective hopper 232. The first drive rollers 630a continue to move the card 501 forward under the card guide 684. As the card 501 passes beneath the card reader 674, the reader 674 can read information from data storage media 608 (e.g., a magnetic stripe). After passing under the card reader 674, the second drive rollers 630b can eject the card 501 through a card exit 688.

As the leading edge 627 of the card 501 moves toward the card exit 688, it depresses a sensor switch or lever 671 operably coupled to a card exit sensor 670 (FIG. 6A). As described in greater detail below, the card exit sensor 670 transmits this information to the dispenser controller 240. The dispenser controller 240 can utilize this information to ascertain and control the position of the card 501 relative to the card carriage 212. For example, if the card 501 has not been properly read, the dispenser controller 240 can use the card position information from the sensor 670 to control the X-axis motor 624 (and the second drive rollers 630b) and move the card 501 back under the card reader 674 for a second attempt to read the card 501. Moreover, when the card 501 has been ejected from the card carriage 212 and the sensor lever 671 returns to its initial position, the dispenser controller 240 can control the X-axis motor 624 to return the D-shaped intake roller 676 to its proper "start" position. This can be accomplished in one embodiment by an absolute encoder 672 operably coupled to the fourth driven pulley 628d. When the absolute encoder 672 determines that the drive belt 618 has reached a position in which the intake roller 676 is oriented with the flat side portion 677 facing toward the card carriage surface 680, the encoder 672 sends a signal to the dispenser controller 240 to stop the motor 624.

Figure 7:
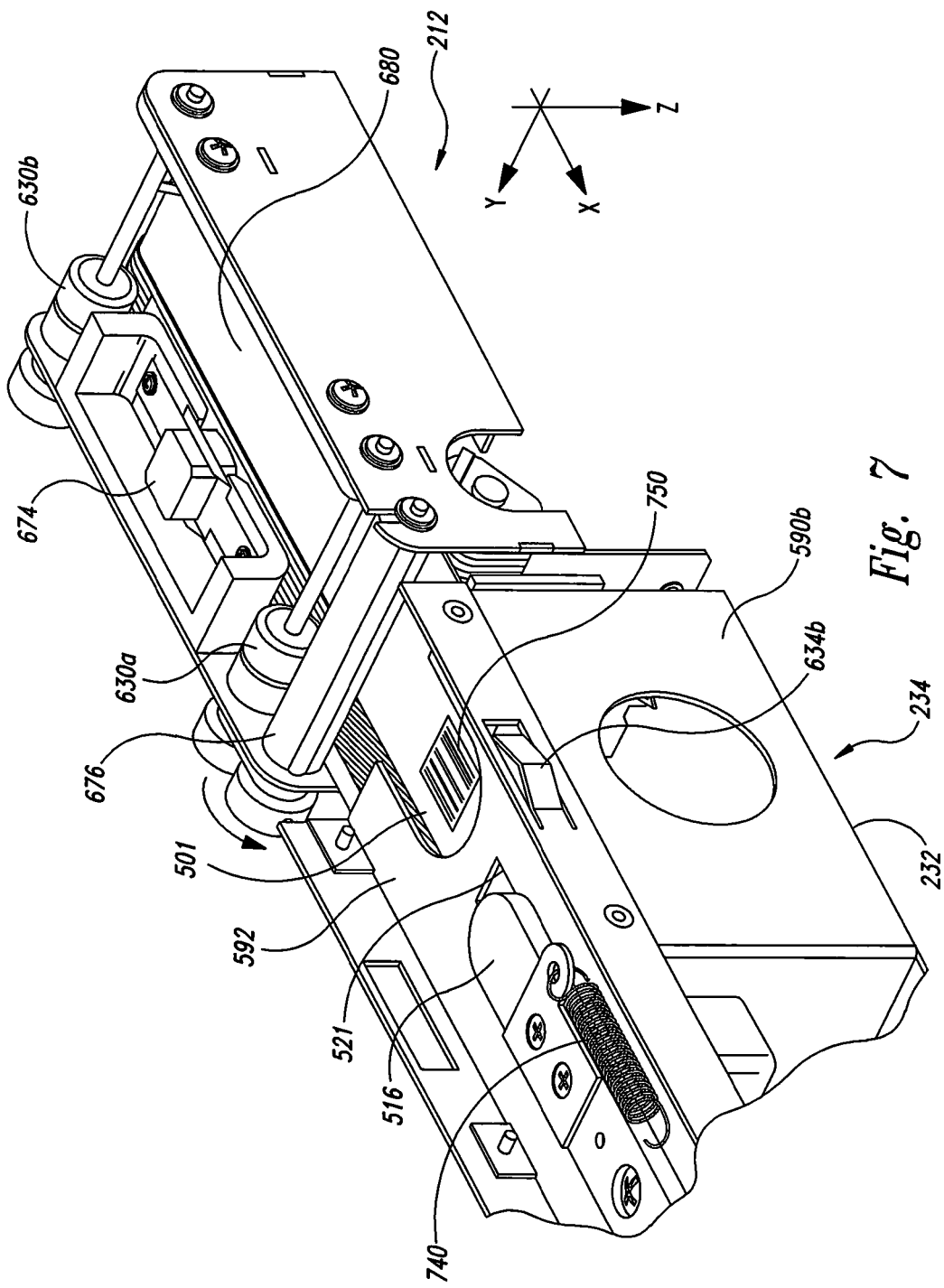
FIG. 7 is a bottom isometric view of the card hopper assembly of FIGS. 5A and 5B ejecting a card into the card carriage of FIGS. 6A and 6B in accordance with an embodiment of the disclosure.

FIG. 7 is a bottom isometric view of the card hopper assembly 234 as it ejects the card 501 into the card carriage 212, in accordance with an embodiment of the disclosure. To transfer the card 501 from the card hopper 232 to the card carriage 212, the controller 240 positions the card carriage 212 so that the card inlet 682 (FIG. 6B) is positioned directly in front of the card exit 596 of the card hopper 232 (FIG. 5A). The card ejector assembly 530 then drives the card 501 a preselected distance (e.g., about one inch) into the card carriage 212 through the inlet 682 as described above with reference to FIGS. 5A and 5B. After driving the card 501 forward, a biasing member 740 (e.g., a coil spring) retracts the slider 516 as the rotator 598 drives the cam block 512 back in the +X direction.

The card intake roller 676 is initially positioned with the flat side portion 677 (FIG. 6B) facing toward the card carriage 212 to form a gap between the flat side portion 677 and the underside surface 680 of the card carriage 212. Once the card ejector assembly 530 drives the card 501 a preset distance through this gap, the controller 240 activates the X-axis motor 624 (FIG. 6A), causing the intake roller 676 to rotate in the first direction 678a (FIG. 6B) and draw the card 501 into the card carriage 212. The first drive rollers 630a continue moving the card 501 in the −X direction and under the card guide 684 so that the reader 674 can read the magnetic stripe 608. In other embodiments, a write head or similar device known in the art (not shown) can write information to the magnetic stripe 608 or other storage media on the card 501 as it passes under the card guide 684.

If the card reader 674 does not adequately read the magnetic stripe 608, the controller 240 can command the X-axis motor 624 (FIG. 6A) to reverse direction of the drive rollers 630 and move the magnetic stripe 508 back under the card reader 624 in a second attempt to read the magnetic stripe 608. The card sensor switch 671 tells the controller 240 what the position of the card 501 is during this procedure and the controller 240 controls the drive rollers 630 accordingly. This prevents the drive rollers 630 from moving the card 501 too far in either direction. This process can be repeated until the magnetic stripe 608 has been adequately read, or until a preset number of attempts have failed and the card 501 is determined to be defective.

As described in greater detail below, the card 501 can also include machine-readable indicia, such as a barcode 750 that can be automatically read and/or decoded by the scanner assembly 250 (FIG. 2A). To read the barcode 750, the card carriage 212 can move the card 501 along the X-axis as needed to position the barcode 750 in a scanner envelope (not shown in FIG. 7). In addition or alternatively, the Y-axis shuttle 416 (FIG. 4) can move the carriage 212 along the Y-axis as needed to position the barcode 750 in the scanner envelope.

Once the magnetic stripe 608 and/or the barcode 750 have been adequately read, the carriage positioning assembly 210 moves the card carriage 212 into position over the card accept chute 260a (FIG. 2A). The drive rollers 630 then eject the card 501 through the card exit 688, and the card 501 falls into the card accept chute 260a for retrieval by the user. Alternatively, if the magnetic stripe 608 and/or the barcode 750 cannot be read or the card 501 is otherwise determined to be unusable, the card carriage 212 moves into position and ejects the card 501 into the card reject chute 260b. If the card 501 is rejected, the card carriage 212 can return to the card hopper 232 to obtain another one of the selected cards to dispense to the user.

Figure 8:
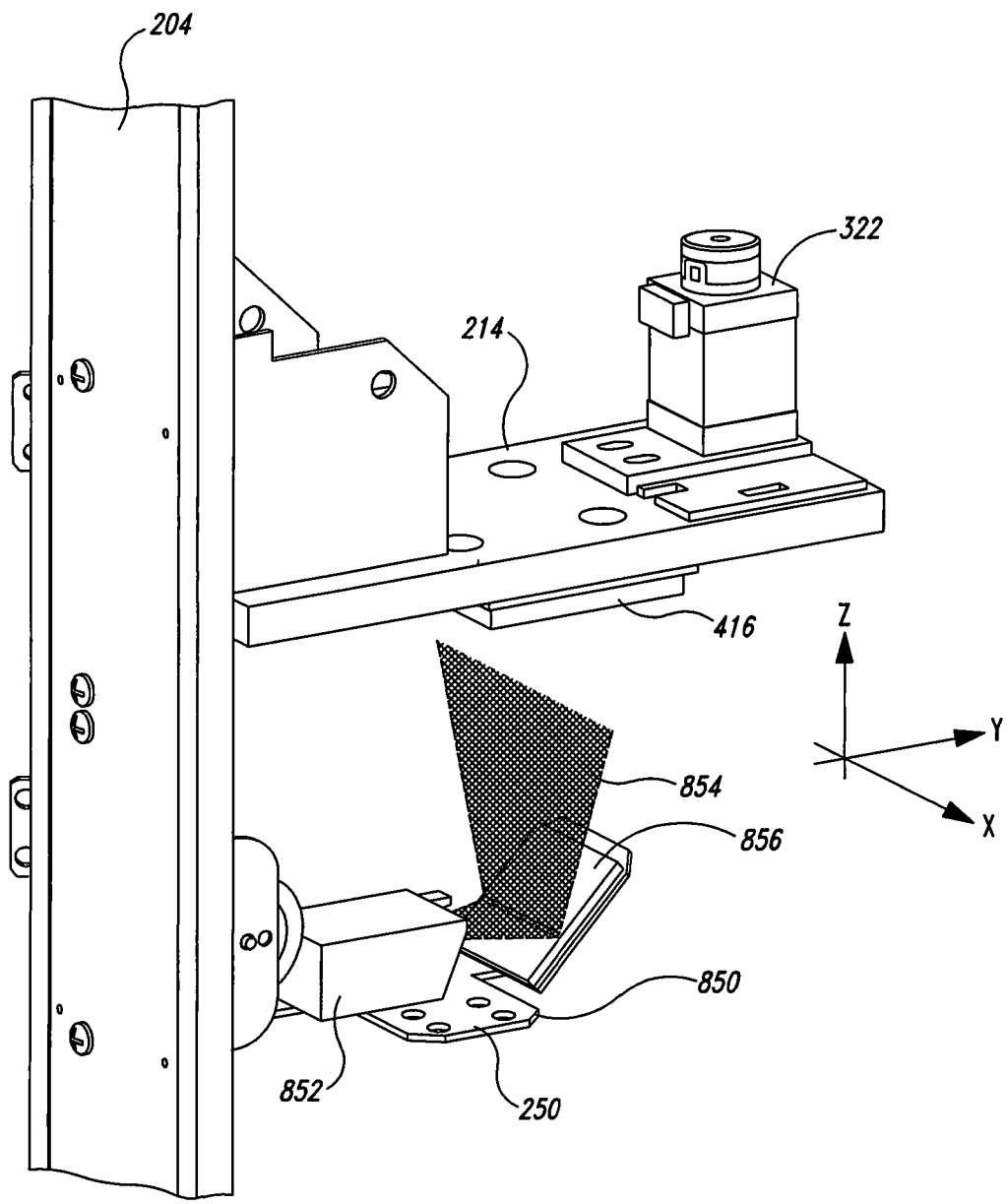
FIG. 8 is an isometric view of the card carriage positioning assembly of FIG. 3, illustrating various aspects of a card scanner assembly configured in accordance with an embodiment of the disclosure.

FIG. 8 is a rear isometric view of the scanner assembly 250 configured in accordance with an embodiment of the disclosure. The scanner assembly 250 can include a reader 852 (e.g., an optical scanner with decoder circuitry) and a reflective surface or mirror 856 mounted to a support member 850. The support member 850 is fixedly attached to the Z-axis shuttle 216 (FIG. 3), and accordingly moves up and down with the Z-axis shuttle 216.

The reader 852 can be capable of reading several different types of indicia (e.g., several different styles of barcode images) that may be present on the bottom side of the card 501. In one embodiment, the reader 852 can include a barcode scanner or reader (e.g., an Opticon NLV-1001) which uses a laser to scan a code symbol and has an onboard decoder to decipher the information before sending it to the dispenser controller 240. The Opticon NLV-1001 laser barcode scanner is capable of decoding the following 1D symbols: JAN/UPC/EAN (WPC incl. add-on), Chinese Post, Codabar/NW-7, Code 11, Code 39, Code 93, Code 128, IATA, Industrial 2 of 5, Interleaved 2 of 5, ISBN-ISMN-ISSN, Korean Post, Matrix 2 of 5, MSI/Plessey-UK/Plessey, RSS, S-Code, Telepen, Tri-Optic, Composite Codes, and the following 2D symbols: MicroPDF417, PDF417.

In the illustrated embodiment, the mirror 856 is positioned at an angle (e.g., a 45 degree angle) in front of the reader 852. As a result, when the reader 852 projects light (e.g., laser light) in a scan envelope 854, the light reflects off the mirror 856 to orient the scan envelope 854 at an angle of 90 degrees, or about 90 degrees, to the underside surface 680 of the card carriage 212 (FIGS. 6B and 7), thereby saving space. The card 501 can be centered, or at least approximately centered, against the underside of the card carriage 212. The Y-axis motor 322 can then move the Y-axis shuttle back and forth along the Y-axis as necessary to move the barcode 750 (FIG. 7) into the scan envelope 854 of the stationary reader 852 so that the reader 852 can suitably read the barcode 750. The card carriage 212 can be configured so that the entire portion of the card 501 where the barcode 750 or other indicia is printed is free of obstruction and therefore easily scanned. In other embodiments, the card dispenser 200 (FIGS. 2A and 2B) can include other types of known reading devices for reading barcodes, magnetic stripes, and/or other indicia and data storage devices on cards.

Figure 9:
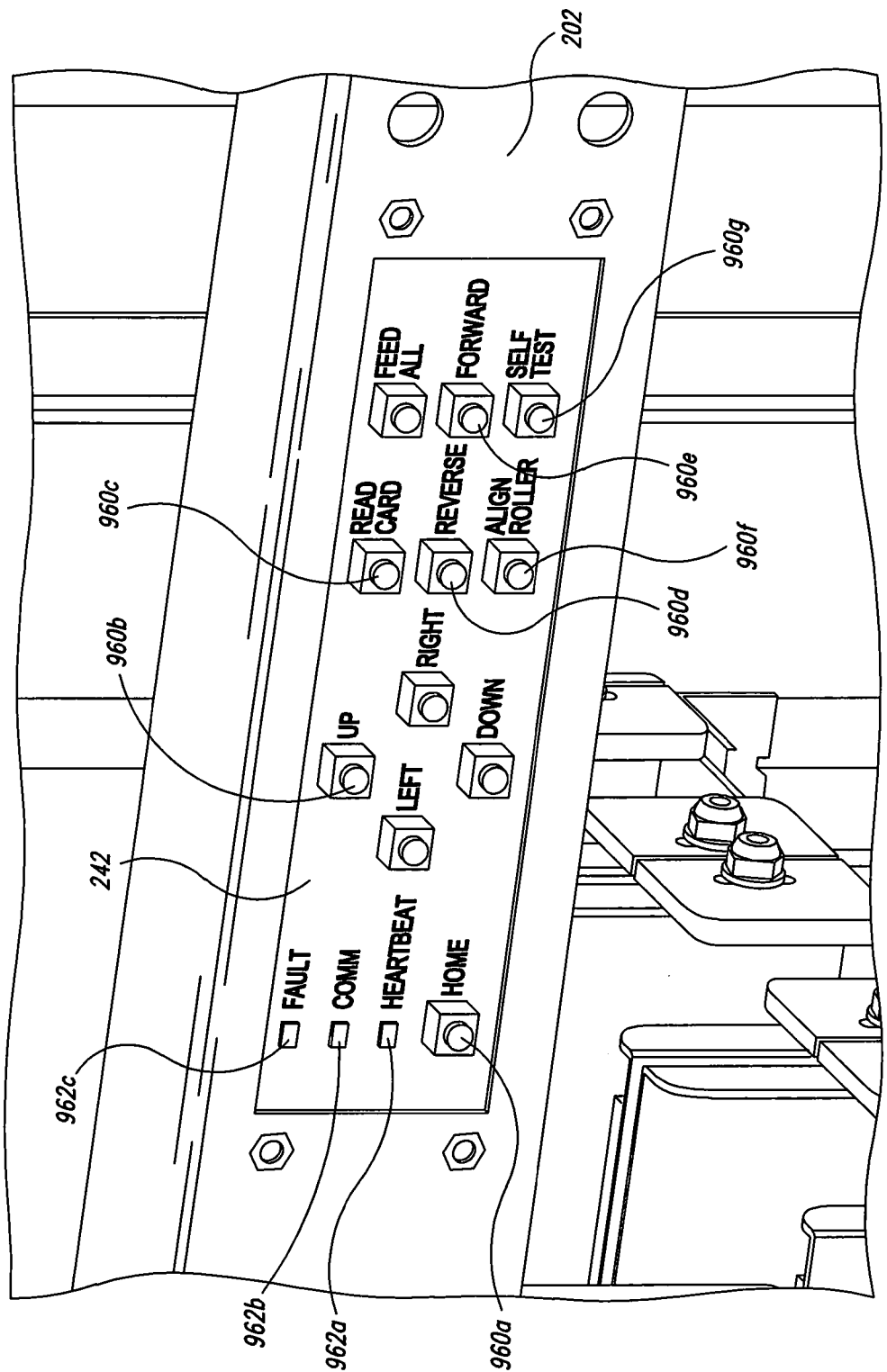
FIG. 9 is a front isometric view of a card dispenser remote controller configured in accordance with an embodiment of the disclosure.

FIG. 9 is an enlarged isometric view of the card dispenser remote controller 242 configured in accordance with an embodiment of the disclosure. As shown in FIG. 2A, the remote controller 242 is positioned on an accessible region of the card dispenser chassis 202. The remote controller 242 allows manual testing and operation of the card dispenser 200 by a service person or other operator (not shown), and enables the operator to assess system health via one or more status lights 962 (e.g., light emitting diodes (LEDs); identified individually as lights 962a-c). The remote controller 242 includes a plurality of manually operable actuators or buttons 960 that the operator can press to operate and/or test various functionalities of the card dispenser 200. For example, the remote controller 242 can include a "home" button 960a that the operator can depress to return the carriage positioning assembly 210 to its home position. The remote controller 242 can also include an "up" button 960b to test movement of the carriage positioning assembly 210 upward along the Z-axis. The remote controller 242 can similarly include "left," "right," and "down" buttons, as well as a "read card" button 960c for testing the ability of the reader 674 to read data storage media such as magnetic stripes. The remote controller 242 can also include a "reverse" button 960d and a "forward" button 960e for testing the reverse and forward motion, respectively, of the drive rollers 630 on the card carriage 212 (FIG. 6B). An "align roller" button 960f can be used to test the alignment capability of the flat side portion of the card intake roller 676 (FIG. 6B), and a "self test" button 960g can be used to initiate an automatic self test of the card dispenser 200.

Figure 10:
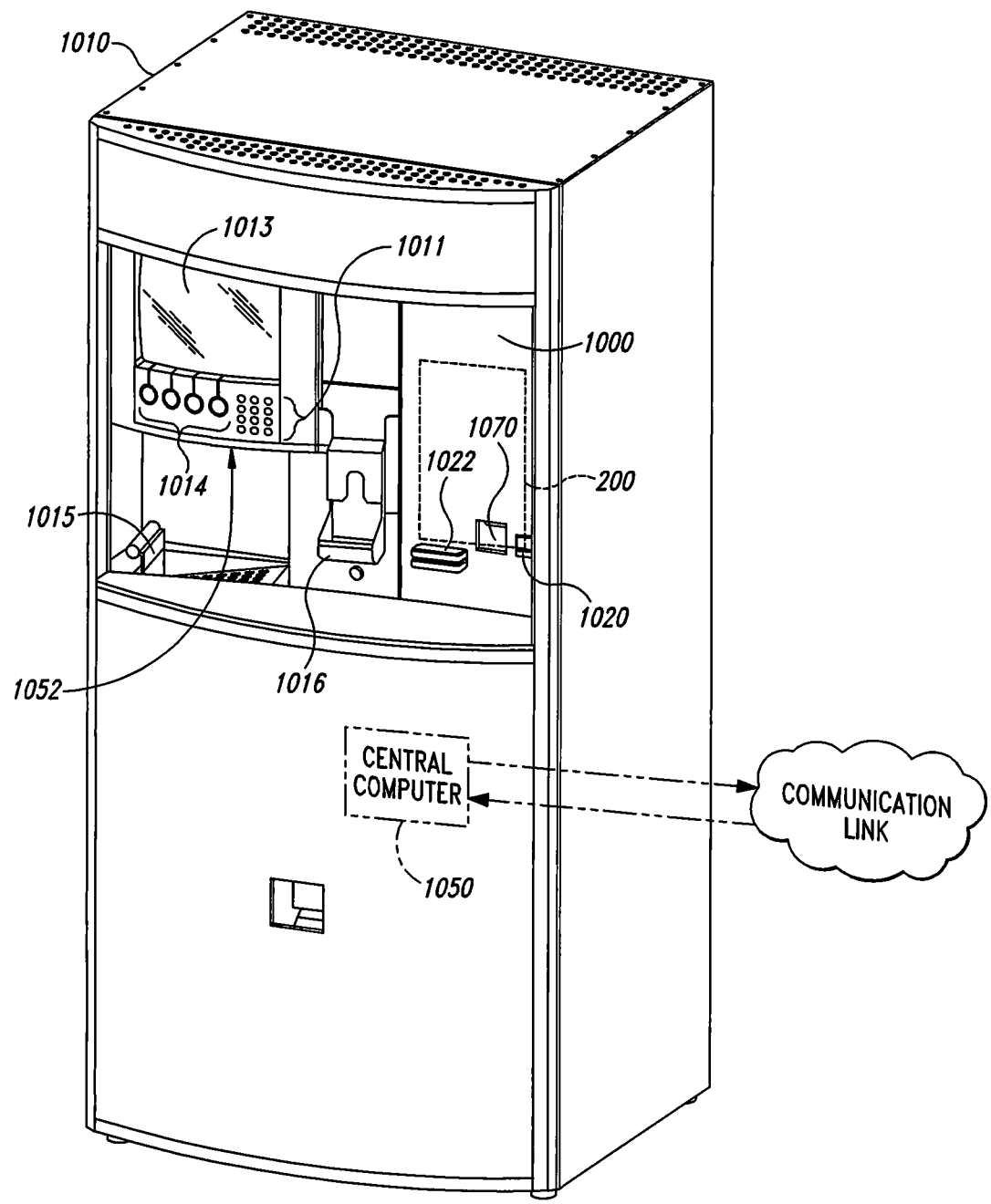
FIG. 10 is a front isometric view of a card vending structure that can include the card dispensing apparatus of FIGS. 2A and 2B.

FIG. 10 is a front isometric view of an example of a kiosk 1010 that can include the card dispenser 200 described in detail above. In one aspect of this embodiment, the kiosk 1010 can include features at least generally similar in structure and function to corresponding features of the coin-counting machines and kiosks described in U.S. Pat. No. 6,494,776, U.S. Pat. No. 6,957,746, and U.S. patent application Ser. No. 11/294,652, which are incorporated herein in their entireties by reference. In other embodiments, however, various aspects of the kiosk 1010 can differ from the machines and kiosks described in these references depending on the particular application. Moreover, in other embodiments, the card dispenser 200 described herein can be used with other kiosks, vending machines, etc.

In another aspect of this embodiment, the kiosk 1010 includes a display screen 1013 positioned proximate to a user interface 1052. The user interface 1052 includes user selection buttons 1014 and a keypad 1011. The display screen 1013 can display various user instructions and prompts explaining how to purchase cards and/or perform other functions with the kiosk 1010. The user selection buttons 1014 can include, for example, various options for responding to the prompts and selecting a desired type of card or a desired method of payment. Similarly, the keypad 1011 can allow the user to input various alphanumeric information, such as account numbers and/or monetary values, related to the card purchase transaction.

In a further aspect of this embodiment, the kiosk 1010 also includes a coin input region or tray 1015 configured to receive a plurality of coins from a user for counting. In one embodiment, the user can elect to receive a redeemable voucher via an outlet 1016 for a value related to the total amount of coins counted. In another embodiment, the user can elect to pay for a card (such as a prepaid credit card or phone card) with coins in addition to or as an alternative to paying for the card with a credit card via a card reader 1022 (e.g., a conventional card swipe) or with paper currency via a bill acceptor 1020.

A user desiring to purchase a card from the kiosk 1010 may do so by first reading the card purchase instructions and prompts displayed on the screen 1013. (Alternatively, the instructions can be provided on the front or side of the kiosk 1010 along with product advertising and/or other graphics.) By using the selection buttons 1014 and/or the keypad 1011 to respond to the prompts, the user can select a particular type of card (e.g., a credit card, debit card, phone card, etc.) and/or a particular card value. In one embodiment, the available card values (e.g., the prepaid amount of money or prepaid long-distance minutes associated with a card) can be predefined such that the user must choose from a limited number of options. In other embodiments, the value may be variable such that the user may be able to specify a particular card value. In either embodiment, the user then enters payment (e.g., via the coin input tray 1015, the card reader 1022, and/or the bill acceptor 1020) sufficient to cover the cost of the selected card. Once the kiosk 1010 confirms receipt of payment, the card dispensing apparatus 200 dispenses the desired card of the desired value to the user via a card outlet 1070 associated with the card accept chute 260a (FIG. 2A).

In one embodiment, the kiosk 1010 can be networked via a central computer 1050 to other card vending machines and/or remote computer systems to exchange information related to card purchases. Such information can include, for example, bank account and credit/debit card account information, in addition to long-distance calling card account information. In another embodiment, the kiosk 1010 can be networked to one or more remote computer systems and configured to transmit an appropriate signal when the machine is out of one or more types of cards. Service personnel with access to the remote computer system can then respond to the signal by restocking the machine with the needed cards. Similar signals can be transmitted from the kiosk 1010 to the remote computer when the machine is malfunctioning, jammed, full of coins or other currency, and/or subject to theft, vandalism, or another form of tampering.

In another embodiment, the card carriage 212 can serve as a card reader for use by the customer when making purchases with an existing credit/debit card. In this embodiment, the card reader 1022 can be replaced by a card slot (not shown) on the front of the kiosk 1010. To make a new card purchase with an existing card, the user inserts their existing credit/debit card into the slot, and the card is drawn into the card carriage 212 and read. After the card has been read, the card carriage returns the card to the customer. Once the credit/debit card transaction has been approved, the card carriage 212 dispenses the new card to the customer as described in detail above. Accordingly, in this embodiment, the card carriage 212 and associated systems serve as both a card reader for use by customers as well as a card dispenser. This can eliminate the cost of the additional card reader 1022 on the front of the kiosk 1010.

Figure 11A:
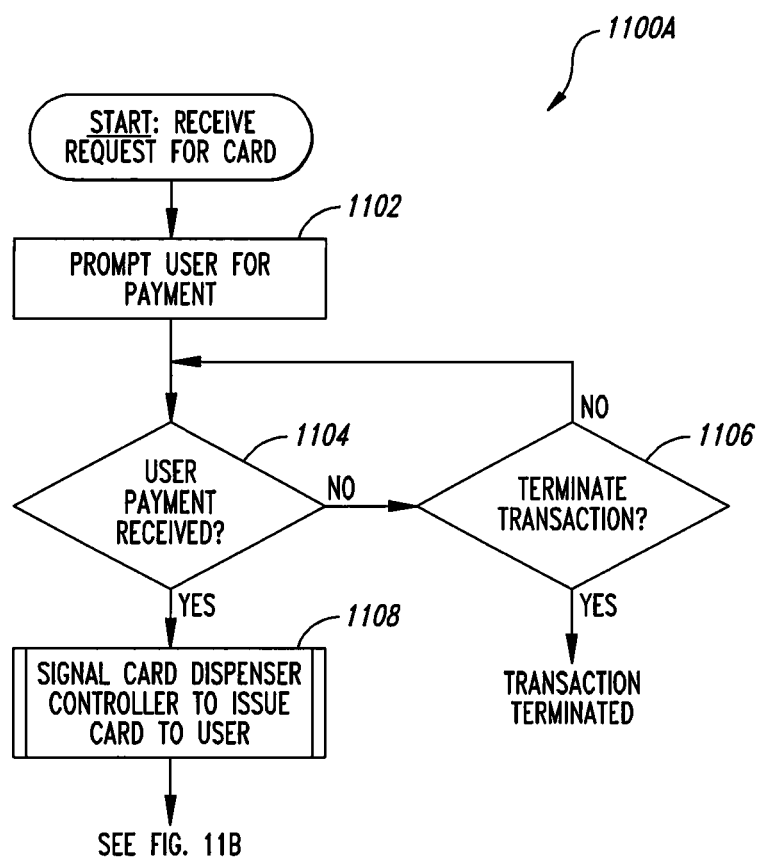
FIGS. 11A and 11B are flow diagrams illustrating a routine for dispensing a card from a kiosk or other enclosure in accordance with an embodiment of the disclosure.

FIG. 11A is a flow diagram illustrating a routine 1100A for dispensing a selected card to a user with the card dispenser 200 of FIGS. 2A and 2B, in accordance with an embodiment of the disclosure. In one aspect of this embodiment, the routine 1100A can be carried out by the central computer 1050 (FIG. 10) according to computer-executable instructions stored on a computer-readable medium, such as a floppy disk, CD-ROM, integrated circuit chip, etc. The routine 1100A starts when the central computer 250 receives a request for a particular type of card. This request may come from the user interface 1052 which, as described above, can include a keypad, touch screen, and/or other user selection buttons. In response to the card request, in block 1102, the routine 1100A prompts the user for payment for the card. Such payment can include cash received in the form of coins or bills, credit received in the form of a credit card account number, and/or debit in the form of a debit card account number. In other embodiments, cards can be purchased using other forms of payment, including voucher and/or prepayment from a remote computer via a computer network or an associated web site.

In decision block 1104, the routine 1100A determines if payment for the card has been received from the user or otherwise confirmed. If payment has not been received, then in decision block 1106 the routine 1100A determines if the transaction should be terminated. In one embodiment, the routine 1100A can elect to terminate the transaction based on the amount of time that has elapsed without receiving payment from the user. In other embodiments, termination can be based on other factors, such as user termination input or lack of a user response to an appropriate prompt. If, however, the routine 1100A determines that the transaction should not be terminated, then the routine 1100A continues to wait for user payment and/or it can reprompt the user for payment. Once the routine 1100A confirms that payment has been received, the routine proceeds to block 1108 and signals the card dispenser controller 240 (FIGS. 2A and 2B) to issue the selected card to the user.

Figure 11B:
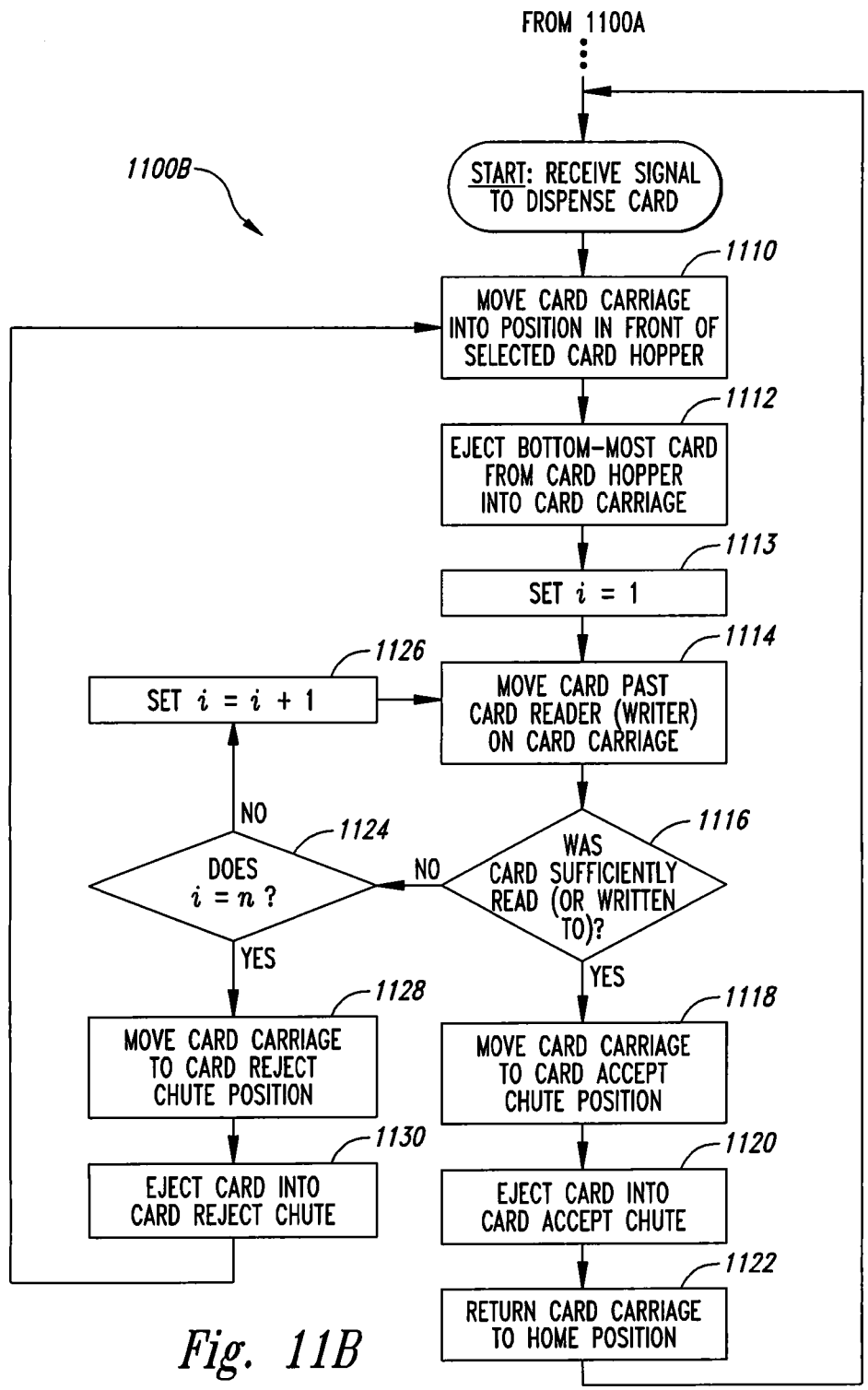

FIG. 11B is a flow diagram illustrating a routine 1100B that continues from routine 1100A. In one aspect of this embodiment, the routine 1100B can be carried out by the card dispenser controller 240 (FIGS. 2A and 2B) when it receives an instruction from the central computer 1050 to dispense a particular card to the user. In block 1110, the routine 1100B responds to the instruction by moving the card carriage 212 into position in front of the card hopper 232 that contains the desired card type. In block 1112, the card hopper assembly 234 ejects the bottom-most card in the card hopper 232 into the card carriage 212 (see, e.g., FIG. 7).

In block 1113, the routine 1100B sets a counter to i=1. Next, in block 1114, the routine 1100B moves the card so that the magnetic stripe or other data storage media on the card passes under the card reader 674 (and/or a card writer). In decision block 1116, the routine 1100B determines if the card was sufficiently read by the card reader 674 (or sufficiently written to by a card writer, if applicable). If so, then the routine 1100B proceeds to block 1118 and moves the card carriage 212 into position relative to the card accept chute 260a. In block 1120, the routine 1100B ejects the card into the card accept chute 260a, from where the card passes to the card outlet chute 1070 (FIG. 10) for retrieval by the user. In block 1122, the routine 1100B returns the card carriage 212 to the home position, and awaits another signal to dispense a card.

Returning to decision block 1116, if the card was not sufficiently read (or written to) by the card reader 674, then the routine 1100B proceeds to decision block 1124 and determines if i=η. Here, η can be a preselected number of times that a given card will be passed by the card reader 674 in an attempt to sufficiently read (or write to) the card before the card is rejected. In one embodiment, for example, η can be three. In other embodiments, η can have other values (e.g., 2, 4, 6, 10, etc.) depending on other factors. If i does not equal η at decision block 1124, then the routine 1100B proceeds to block 1126 and increments i by one. Next, the routine 1100B returns to block 1114 and repeats. If i does equal η at decision block 1124, then the routine 1100B proceeds to block 1128 and moves the card carriage 212 into position relative the card reject chute 260b. In block 1130, the routine 1100B ejects the unread card into the card reject chute 260b. The card reject chute 260b can lead to an escrow bin that holds rejected cards for retrieval by a machine service person. From block 1130, the routine 1100B returns to block 1110 and repeats until the desired card has been provided to the user (or until the machine runs out of the desired card type).

Figure 12A:
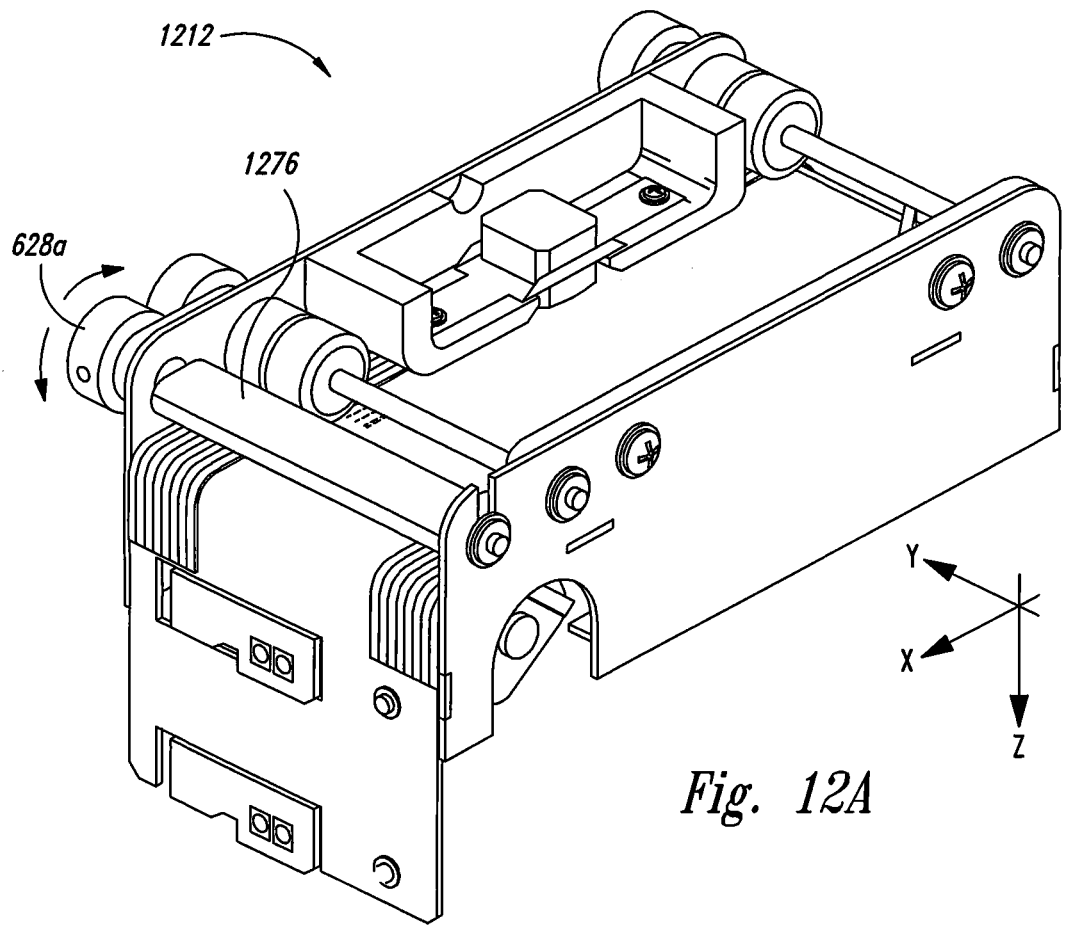
FIG. 12A is a bottom isometric view of a card carriage having a card intake roller configured in accordance with another embodiment of the disclosure.
Figure 12B:
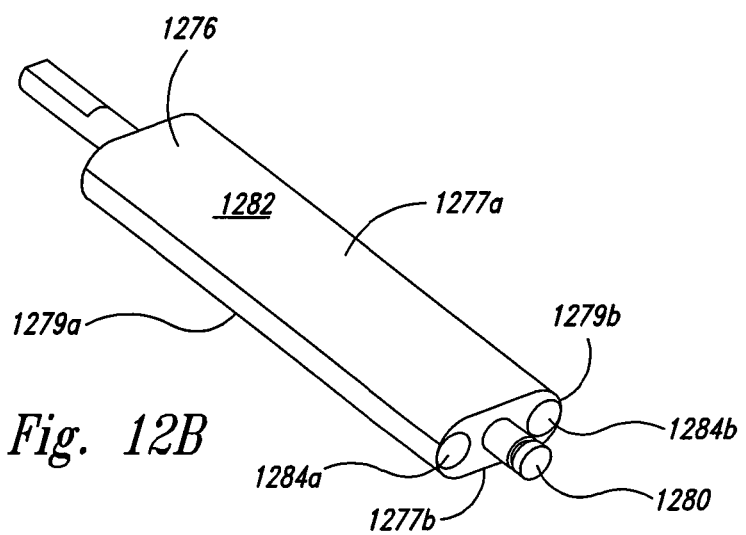
FIG. 12B is an enlarged isometric view of the card intake roller of FIG. 12A.

FIG. 12A is a bottom isometric view of a card carriage 1212 having a card intake roller 1276 configured in accordance with another embodiment of the disclosure, and FIG. 12B is an enlarged isometric view of the card intake roller 1276. Referring to FIGS. 12A and 12B together, the card carriage 1212 is at least generally similar in structure and function to the card carriage 212 described in detail above. For example, the card intake roller 1276 is driven by the first driven pulley 628a which is operably coupled to a central shaft 1280 of the card intake roller 1276. In this particular embodiment, however, the card intake roller 1276 has an oval or obround cross-sectional shape with opposing first and second flat side portions 1277a, b, and opposing first and second round side portions 1279 a, b. In one aspect of this embodiment, the round side portions 1279 can be formed from compressible members 1284a, b (e.g., rubber cords) having circular cross-sections. The compressible members 1284 are held in appropriately-shaped recesses in the body 1282 of the roller 1276, so that a portion of each member is exposed to form a compressible, rounded outer surface of the intake roller 1276.

In operation, the flat side portions 1277 of the intake roller 1276 initially face toward the underside surface of the card carriage 1212, so that the leading edge of a card can pass under the roller 1276 unimpeded. Once the card is beneath the intake roller 1276, the X-axis motor 624 (FIG. 6A) drives the intake roller 1276 in a first direction so that one of the round side portions 1279 contacts the card and pulls it from the respective hopper 232. The first drive rollers 630a continue to move the card forward under the card guide 684 (FIG. 6B). The card proceeds through the card carriage 1212 as described above with reference to the card carriage 212.

The foregoing description of embodiments of the invention is not intended to be exhaustive or to limit the invention to the precise embodiments disclosed. While specific embodiments of, and examples for, the invention are described herein for illustrative purposes, various equivalent modifications are possible within the scope of the invention, as those of ordinary skill in the relevant art will recognize. For example, although certain functions may be described in the present disclosure in a particular order, in alternate embodiments these functions can be performed in a different order or substantially concurrently, without departing from the spirit or scope of the present disclosure. In addition, the teachings of the present disclosure can be applied to other systems, not only the representative card vending systems described herein. Further, various aspects of the invention described herein can be combined to provide yet other embodiments.

All of the references cited herein are incorporated in their entireties by reference. Accordingly, aspects of the invention can be modified, if necessary or desirable, to employ the systems, functions, and concepts of the cited references to provide yet further embodiments of the invention. These and other changes can be made to the invention in light of the above-detailed description. In general, the terms used in the following claims should not be construed to limit the invention to the specific embodiments disclosed in the specification, unless the above-detailed description explicitly defines such terms. Accordingly, the actual scope of the invention encompasses the disclosed embodiments and all equivalent ways of practicing or implementing the invention under the claims.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below," and words of similar import, when used in this application, shall refer to this application as a whole and not to any particular portions of this application. When the claims use the word "or" in reference to a list of two or more items, that word covers all of the following interpretations of the word: any of the items in the list, all of the items in the list, and any combination of the items in the list.

From the foregoing, it will be appreciated that specific embodiments of the invention have been described herein for purposes of illustration, but that various modifications may be made without deviating from the spirit and scope of the various embodiments of the invention. Further, while various advantages associated with certain embodiments of the invention have been described above in the context of those embodiments, other embodiments may also exhibit such advantages, and not all embodiments need necessarily exhibit such advantages to fall within the scope of the invention. Accordingly, the invention is not limited, except as by the appended claims.

I claim:

1. A card dispensing apparatus comprising:
    an array of card hoppers, wherein the array of card hoppers includes at least two vertical columns of card hoppers positioned side by side, wherein each vertical column includes two or more card hoppers, and wherein each of the individual card hoppers is configured to hold a plurality of horizontally oriented cards in a vertical stack;
    a plurality of card ejectors, wherein each of the card ejectors is fixedly associated with a corresponding one of the card hoppers; and
    a card carriage selectively movable between each of the card hoppers, wherein the card carriage is configured to respond to a card selection by moving into position proximate a corresponding one of the card hoppers, wherein the card ejector operably associated with the corresponding card hopper is configured to eject one of the cards from the corresponding card hopper in response to a signal associated with the card selection, wherein the card carriage is configured to receive the ejected card from the corresponding card hopper, and wherein the card carriage is further configured to transport the received card toward a card accept chute and dispense the card into the card accept chute for retrieval by a user.

2. The card dispensing apparatus of claim 1, wherein the array of card hoppers is a 3×5 array of three vertical columns of five card hoppers each.

3. The card dispensing apparatus of claim 1 wherein the array of card hoppers includes at least two horizontal rows of card hoppers, wherein each horizontal row of card hoppers includes two or more card hoppers, wherein the vertical columns of card hoppers are aligned with a Z axis and the horizontal rows of card hoppers are aligned with a Y axis, and wherein the card dispensing apparatus further comprises:
a vertical support extending adjacent to the card hopper array and aligned with the Z axis; and
a horizontal support extending outwardly from the vertical support and aligned with the Y-axis, wherein the card carriage is movably mounted to the horizontal support, wherein the horizontal support is movably coupled to the vertical support and configured to move up and down along the vertical support to position the card carriage at an appropriate elevation relative to the corresponding card hopper, and wherein the card carriage is configured to move back and forth along the horizontal support to position the card carriage adjacent to the corresponding card hopper.

4. The card dispensing apparatus of claim 3 wherein the card carriage is configured to move back and forth along the horizontal support in front of the array of card hoppers, and wherein the plurality of card ejectors are fixedly positioned behind the array of card hoppers.

5. The card dispensing apparatus of claim 1, further comprising:
a card reader mounted to the card carriage;
an optical scanner; and
a movable carriage positioning assembly, wherein the optical scanner and the card carriage are mounted to the carriage positioning assembly, wherein each of the plurality of cards includes a magnetic stripe and machine-readable indicia, and wherein the card reader is configured to read the magnetic stripe on the selected card and the optical scanner is configured to read the machine-readable indicia on the selected card when the selected card is positioned on the card carriage.

6. The card dispensing apparatus of claim 5 wherein the magnetic stripe is disposed on a first side of each card, and wherein the machine-readable indicia is disposed on a second, opposite side of each card.

7. The card dispensing apparatus of claim 5, wherein the card carriage is movably mounted to the carriage positioning assembly, and wherein the optical scanner is fixedly mounted to the carriage positioning assembly.

8. A card dispensing apparatus comprising:
an array of card hoppers, wherein the array of card hoppers includes at least two vertical columns of card hoppers positioned side by side, wherein each vertical column includes two or more card hoppers, and wherein each of the individual card hoppers is configured to hold a plurality of horizontally oriented cards in a vertical stack; and
a card carriage that includes a card reader, wherein the card carriage is configured to respond to a card selection by moving into position proximate a corresponding one of the card hoppers and receiving the selected card from the corresponding card hopper, and wherein the card carriage is further configured to transport the selected card toward a card accept chute and dispense the card into the card accept chute for retrieval by a user after the card reader has sufficiently read information off the card.

9. The card dispensing apparatus of claim 8, further comprising a card reject chute, wherein the card carriage is configured to dispense the card into the card reject chute and retrieve another card from the corresponding card hopper if the card reader has insufficiently read information off the card.

10. A card dispensing apparatus comprising:
an array of card hoppers, wherein the array of card hoppers includes at least two vertical columns of card hoppers positioned side by side and at least two horizontal rows of card hoppers, wherein each horizontal row of card hoppers includes two or more card hoppers, wherein each vertical column includes two or more card hoppers, wherein the vertical columns of card hoppers are aligned with a Z axis and the horizontal rows of card hoppers are aligned with a Y axis, and wherein each of the individual card hoppers is configured to hold a plurality of horizontally oriented cards in a vertical stack;
a card carriage configured to respond to a card selection by moving into position proximate a corresponding one of the card hoppers and receiving the selected card from the corresponding card hopper, wherein the card carriage is further configured to transport the received card toward a card accept chute and dispense the card into the card accept chute for retrieval by a user;
a vertical support extending adjacent to the card hopper array and aligned with the Z axis; and
a horizontal support extending outwardly from the vertical support and aligned with the Y-axis, wherein the card carriage is movably mounted to the horizontal support, wherein the horizontal support is movably coupled to the vertical support and configured to move up and down along the vertical support to position the card carriage at an appropriate elevation relative to the corresponding card hopper, and wherein the card carriage is configured to move back and forth along the horizontal support to position the card carriage adjacent to the corresponding card hopper.

11. A card dispensing apparatus comprising:
a vertical array of card hopper assemblies, the vertical array including a first row of card hopper assemblies positioned above a second row of card hopper assemblies, wherein each row of card hopper assemblies includes two or more card hopper assemblies; and wherein each of the card hopper assemblies includes:
a card hopper; and
an individual card ejector assembly operably coupled to the card hopper, wherein the card hopper is configured to hold a stack of cards; and
a card carriage selectively movable between each of the card hopper assemblies, wherein the card carriage is configured to respond to a card selection by moving into position proximate a corresponding card hopper assembly, wherein the corresponding card ejector assembly is configured to selectively drive one of the cards out of the corresponding card hopper in response to a signal associated with the card selection, and wherein the card carriage is configured to receive the card from the corresponding card hopper and transport the card toward a card accept chute.

12. The card dispensing apparatus of claim 11, wherein the ejector assembly is configured to drive the bottom-most card from the card stack to eject the bottom-most card from the card hopper.

13. The card dispensing apparatus of claim 11, further comprising a chassis that supports the vertical array of card hopper assemblies, wherein each of the card hopper assemblies includes one or more releasable attachment features which enable the card hopper assemblies to be readily installed on the chassis without the use of special tools.

14. A method for dispensing cards from a kiosk, the method comprising:
- receiving a request for a selected card;
- in response to the request, moving a card carriage a first distance along a vertical axis and a second distance along a horizontal axis to position the card carriage proximate one of a plurality of card hoppers in an array of card hoppers;
- operating a card ejector positioned separate from the card carriage to eject the selected card from a stack of cards held in the card hopper;
- receiving the ejected card on the card carriage;
- reading information off the card;
- moving the card carriage away from the card hopper and the card ejector to a card accept chute, and dispensing the card into the accept chute when the information was sufficiently read off the card; and
- moving the card carriage to a card reject chute and dispensing the card into the reject chute when the information was insufficiently read off the card.

* * * * *

UNITED STATES PATENT AND TRADEMARK OFFICE
CERTIFICATE OF CORRECTION

PATENT NO. : 8,550,294 B2  
APPLICATION NO. : 12/806531  
DATED : October 8, 2013  
INVENTOR(S) : Douglas A. Martin Page 1 of 1

It is certified that error appears in the above-identified patent and that said Letters Patent is hereby corrected as shown below:

In the Claims

In column 16, line 41, in claim 11, delete "assemblies;" and insert -- assemblies, --, therefor.

Signed and Sealed this  
Seventeenth Day of December, 2013

Margaret A. Focarino  
*Commissioner for Patents of the United States Patent and Trademark Office*